(12) United States Patent
Boratav et al.

(10) Patent No.: US 11,702,355 B2
(45) Date of Patent: Jul. 18, 2023

(54) APPARATUSES INCLUDING EDGE DIRECTORS FOR FORMING GLASS RIBBONS

(71) Applicant: CORNING INCORPORATED, Corning, NY (US)

(72) Inventors: Olus Naili Boratav, Ithaca, NY (US); Steven Roy Burdette, Big Flats, NY (US); Gaozhu Peng, Horseheads, NY (US); William Anthony Whedon, Corning, NY (US)

(73) Assignee: Corning Incorporated, Corning, NY (US)

( * ) Notice: Subject to any disclaimer, the term of this patent is extended or adjusted under 35 U.S.C. 154(b) by 399 days.

(21) Appl. No.: 16/765,636

(22) PCT Filed: Nov. 20, 2018

(86) PCT No.: PCT/US2018/062015
§ 371 (c)(1),
(2) Date: May 20, 2020

(87) PCT Pub. No.: WO2019/104039
PCT Pub. Date: May 31, 2019

(65) Prior Publication Data
US 2020/0299172 A1    Sep. 24, 2020

Related U.S. Application Data

(60) Provisional application No. 62/589,651, filed on Nov. 22, 2017.

(51) Int. Cl.
*C03B 17/06* (2006.01)

(52) U.S. Cl.
CPC .................... *C03B 17/064* (2013.01)

(58) Field of Classification Search
CPC ................ C03B 17/064; C03B 18/06
See application file for complete search history.

(56) References Cited

U.S. PATENT DOCUMENTS

| 1,878,392 A | 9/1932 | George |
| 3,191,857 A | 6/1965 | Galey et al. |

(Continued)

FOREIGN PATENT DOCUMENTS

| AU | 2002319794 | 2/2003 |
| BE | 355148 A | 10/1928 |

(Continued)

OTHER PUBLICATIONS

International Search Report and Written Opinion of the International Searching Authority; PCT/US2018/062015; dated May 22, 2019; 10 Pages; Korean Intellectual Property Office.

(Continued)

*Primary Examiner* — Jodi C Franklin
(74) *Attorney, Agent, or Firm* — Kevin M. Able

(57) ABSTRACT

An apparatus for downwardly drawing a glass ribbon includes a forming vessel including an upper portion including a pair of outside surfaces and a forming wedge portion including a pair of downwardly inclined forming surfaces converging along a downstream direction to form a bottom edge. An edge director is provided that includes a flow directing portion formed from a portion of a frustoconical or conical shape.

10 Claims, 21 Drawing Sheets

(56) References Cited

U.S. PATENT DOCUMENTS

| | | | |
|---|---|---|---|
| 3,337,319 | A | 8/1967 | Edwards |
| 3,451,798 | A * | 6/1969 | Simon .................. C03B 17/064 65/121 |
| 3,537,834 | A * | 11/1970 | Simon .................. C03B 17/064 65/121 |
| 4,297,118 | A | 10/1981 | Kellar et al. |
| 4,349,375 | A | 9/1982 | Kellar et al. |
| 6,889,526 | B2 | 5/2005 | Pitbladdo |
| 7,409,839 | B2 * | 8/2008 | Boratav ................ C03B 17/064 65/193 |
| 7,685,841 | B2 | 3/2010 | Boratav et al. |
| 7,818,980 | B2 * | 10/2010 | Burdette ............... C03B 17/064 65/193 |
| 8,176,753 | B2 * | 5/2012 | Kahlout ................ C03B 17/064 65/193 |
| 8,393,176 | B2 | 3/2013 | Tsuda et al. |
| 8,726,695 | B2 * | 5/2014 | Kano ..................... C03B 18/06 65/92 |
| 8,794,034 | B2 * | 8/2014 | Grzesik ................. C03B 17/064 65/195 |
| 9,162,919 | B2 * | 10/2015 | Ellison .................. C03C 3/093 |
| 9,512,025 | B2 * | 12/2016 | Chung ................... C03B 17/068 |
| 10,377,657 | B2 | 8/2019 | Nitschke et al. |
| 10,392,288 | B2 | 8/2019 | Boratav et al. |
| 10,703,664 | B2 | 7/2020 | Feenaughty et al. |
| 2005/0183455 | A1 * | 8/2005 | Pitbladdo ............. C03B 17/064 65/159 |
| 2006/0242994 | A1 * | 11/2006 | Boratav ................ C03B 17/064 65/333 |
| 2008/0264104 | A1 | 10/2008 | Boratav et al. |
| 2011/0100057 | A1 | 5/2011 | Gaylo |
| 2014/0318182 | A1 * | 10/2014 | Coppola ............... C03B 17/067 65/29.21 |
| 2015/0218028 | A1 * | 8/2015 | Tamamura ........... C03B 17/064 65/195 |
| 2015/0329401 | A1 * | 11/2015 | Chung ................... C03B 17/064 65/195 |
| 2017/0044041 | A1 | 2/2017 | Godard et al. |
| 2017/0349471 | A1 * | 12/2017 | Boratav ................ C03B 17/064 |
| 2020/0270161 | A1 | 8/2020 | Delia et al. |

FOREIGN PATENT DOCUMENTS

| | | |
|---|---|---|
| BE | 638796 A | 4/1964 |
| BE | 696185 | 9/1967 |
| CA | 809597 A | 4/1969 |
| CA | 878045 A | 8/1971 |
| CN | 102369166 A | 3/2012 |
| CN | 103140447 A | 6/2013 |
| CN | 107001098 A | 8/2017 |
| DE | 1421762 A1 | 10/1968 |
| GB | 0299393 A | 9/1929 |
| GB | 0972291 A | 10/1964 |
| GB | 1034333 A | 6/1966 |
| GB | 1151288 A | 5/1969 |
| GB | 1283778 A | 8/1972 |
| IT | 1152942 B | 1/1987 |
| JP | 50-002611 B1 | 1/1975 |
| JP | 2012-519134 A | 8/2012 |
| JP | 2015-512849 A | 4/2015 |
| JP | 2017-500263 A | 1/2017 |
| JP | 2017-530929 A | 10/2017 |
| KR | 10-2004-0044192 A | 5/2004 |
| KR | 10-2005-0112081 A | 11/2005 |
| KR | 10-0754758 B1 | 7/2007 |
| KR | 10-2007-0108252 A | 11/2007 |
| KR | 10-2008-0107355 A | 12/2008 |
| KR | 10-1082712 B1 | 11/2011 |
| KR | 10-2012-0092640 A | 8/2012 |
| KR | 10-1224666 B1 | 1/2013 |
| KR | 10-1334019 B1 | 12/2013 |
| KR | 10-2017-0060152 A | 5/2017 |
| KR | 10-2017-0066485 A | 6/2017 |
| KR | 10-1745035 B1 | 6/2017 |
| KR | 1020170066487 A | 6/2017 |
| KR | 101791686 B1 | 10/2017 |
| MX | 345151 B | 1/2017 |
| TW | I317352 B | 11/2009 |
| TW | 201111301 A | 4/2011 |
| TW | I447078 B | 8/2014 |
| TW | 201612119 A | 4/2016 |
| TW | I602789 B | 10/2017 |
| WO | 2003/014032 A1 | 2/2003 |
| WO | 2004/069757 A2 | 8/2004 |
| WO | 2006/091389 A2 | 8/2006 |
| WO | 2006/091730 A1 | 8/2006 |
| WO | 2007/070825 A2 | 6/2007 |
| WO | 2007130298 A1 | 11/2007 |
| WO | 2010/099278 A2 | 9/2010 |
| WO | 2011/059690 A2 | 5/2011 |
| WO | 2016/054130 A1 | 4/2016 |
| WO | 2016/054325 A1 | 4/2016 |
| WO | 2016057368 A1 | 4/2016 |
| WO | 2016133798 A1 | 8/2016 |
| WO | 2017/087183 A2 | 5/2017 |
| WO | 2017/087463 A1 | 5/2017 |
| WO | 2017/210233 A1 | 12/2017 |

OTHER PUBLICATIONS

Chinese Patent Application No. 201880079602.7, Office Action dated Mar. 24, 2022, 13 pages (5 pages of English Translation and 8 pages of Original Document), Chinese Patent Office.

Taiwanese Patent Application No. 107141566, Office Action, dated Mar. 16, 2022, 1 page; Taiwanese Patent Office.

Japanese Patent Application No. 2020-528074, Decision to Grant dated Mar. 9, 2023, 2 pages (English Translation only), Japanese Patent Office.

* cited by examiner

APPARATUSES INCLUDING EDGE DIRECTORS FOR FORMING GLASS RIBBONS

CROSS REFERENCE TO RELATED APPLICATIONS

This application claims the benefit of priority under 35 U.S.C. § 371 of International Application No. PCT/US18/62015, filed on Nov. 20, 2018, which claims the benefit of priority of U.S. Provisional Application Ser. No. 62/589,651 filed Nov. 22, 2017 on the contents of which are relied upon and incorporated herein by reference in their entity as if fully set forth below.

BACKGROUND

Field

The present specification generally relates to methods and apparatuses for making glass ribbons and, in particular, methods and apparatuses including edge directors for forming glass ribbons.

Technical Background

Glass forming apparatuses are commonly used to form various glass products such as glass sheets used for LCD displays and the like. These glass sheets may be manufactured by downwardly flowing molten glass over a forming wedge to form a continuous glass ribbon, referred to as a fusion process. In the past, fusion processes have used an edge director. The primary purpose of the edge director is to increase the overall width of glass sheets. Generally the upper limit of sheet width is limited by the "dam-to-dam" distance on the vertical section of a forming vessel. In the absence of any type of edge director on the forming vessel "root" section, the four edges of the two opposing glass layers tend to flow toward the center of the forming vessel while each layer as a whole flows toward the root line where the two sides fuse together. The maximum width of a sheet that would result from this scenario would be reduced.

Current edge directors may reduce some of this width loss of glass sheets, but while doing so, may create a Y-shaped edge that requires the use of edge rolls to press-fuse prongs of the Y together. As a fusion draw apparatus ages, the Y-shaped edge can become more difficult to fuse, even with edge rolls, and can eventually lead to air holes in the edge portion of the glass ribbon, so called hollow edges. Any asymmetry of the Y shape that develops over time can lead to mismatch in the edges, so called edge mismatch. Both hollow edges and edge mismatch can present ribbon stability issues and limit the life of the fusion draw apparatus.

SUMMARY

According to one embodiment, an apparatus for downwardly drawing a glass ribbon comprising: a forming vessel comprising: an upper portion including a pair of outside surfaces that extend parallel to each other, the pair of outside surfaces defining a width of the forming vessel; and a forming wedge portion including a pair of downwardly inclined forming surfaces converging along a downstream direction to form a bottom edge; a flow blocking portion that extends alongside the forming wedge; and an edge director comprising: a first flow directing portion formed from an arc portion of a first frustoconical or conical shape that intersects one of the inclined forming surfaces along a first edge of the first flow directing portion and intersects the flow blocking portion along a second edge of the first flow directing portion; and a second flow directing portion formed from an arc portion of a second frustoconical or conical shape that intersects the other of the inclined forming surfaces along a first edge of the second flow directing portion and intersects the flow blocking portion along a second edge of the second flow directing portion; wherein a distance between lowermost endpoints of intersection of the first flow directing portion and the second flow directing portion with the flow blocking portion is no greater than 80 percent of the width of the forming vessel.

In another embodiment, an apparatus for downwardly drawing a glass ribbon comprising: a forming vessel comprising: an upper portion including a pair of outside surfaces that extend parallel to each other defining a width of the forming vessel between the outside surfaces; and a forming wedge portion including a pair of downwardly inclined forming surfaces converging along a downstream direction to form a bottom edge; a flow blocking portion that provides a dam that extends alongside the forming wedge; and an edge director comprising a flow directing portion formed from an arc portion of a frustoconical or conical shape that intersects one of the inclined forming surfaces along a first edge of the flow directing portion and intersects the flow blocking portion along a second edge of the flow directing portion; wherein the frustoconical or conical shape has a cone angle of at least 20 degrees, the cone angle measured from a central axis of the frustoconical or conical shape to an outer surface of the frustoconical or conical shape.

In yet another embodiment, a method of making a glass ribbon comprising: flowing molten glass over an upper portion of a forming vessel including a pair of outside surfaces that extend parallel to each other defining a width of the forming vessel between the outside surfaces and a forming wedge portion including a pair of downwardly inclined forming surface portions that converge along a downstream direction to form a bottom edge; flowing the molten glass over a flow blocking portion that provides a dam that extends alongside the forming wedge; flowing molten glass over an edge director comprising a first flow directing portion formed from an arc portion of a first frustoconical or conical shape that intersects one of the inclined forming surfaces along a first edge of the first flow directing portion and intersects the flow blocking portion along a second edge of the first flow directing portion; and flowing molten glass over a second flow directing portion of the edge director formed from an arc portion of a second frustoconical or conical shape that intersects the other of the inclined forming surfaces along a first edge of the second flow directing portion and intersects the flow blocking portion along a second edge of the second flow directing portion; wherein a distance between lowermost endpoints of intersection of the first flow directing portion and the second flow directing portion with the flow blocking portion is no greater than 80 percent of the width of the forming vessel.

Additional features and advantages of the methods and apparatuses for forming glass ribbons will be set forth in the detailed description which follows, and in part will be readily apparent to those skilled in the art from that description or recognized by practicing the embodiments described herein, including the detailed description which follows the claims, as well as the appended drawings.

It is to be understood that both the foregoing general description and the following detailed description describe various embodiments and are intended to provide an over-view or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
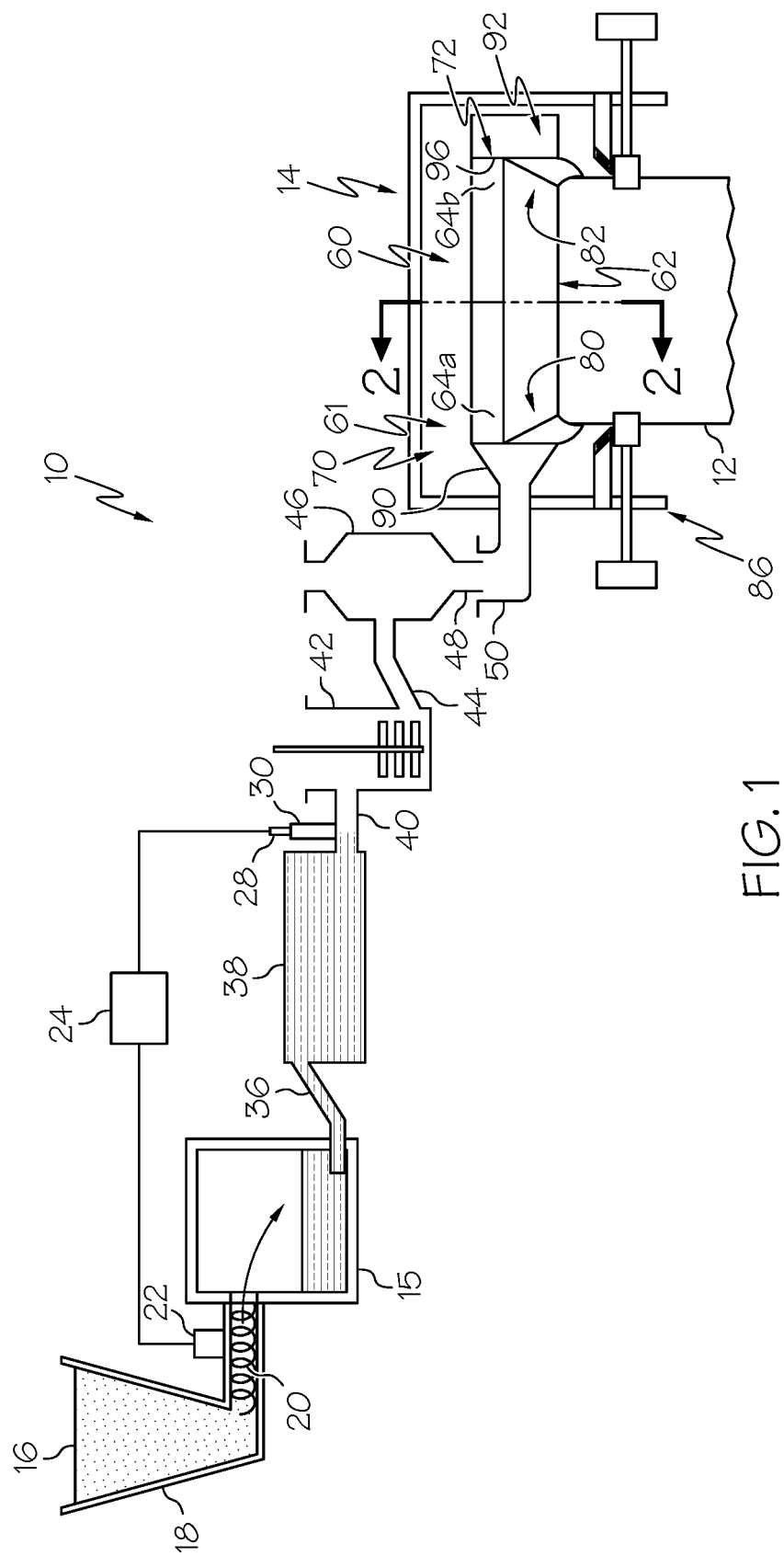
FIG. 1 schematically depicts an apparatus for forming a glass ribbon according to one or more embodiments shown and described herein.

Reference will now be made in detail to embodiments of the methods and apparatuses for forming glass ribbons and edge directors for use with the same, examples of which are illustrated in the accompanying drawings. One embodiment of an apparatus for making glass ribbons is shown in FIG. 1, and is designated generally throughout by the reference number 10. The apparatus 10 generally includes a pair of opposing edge directors located at opposite ends of a forming vessel. As will be described in greater detail below, the edge directors are configured to reduce width loss of the glass ribbon during the forming process. Various embodiments of methods and apparatuses for forming glass ribbons and edge directors for use with the same will be described in further detail herein with specific reference to the appended drawings.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Referring now to FIG. 1, one embodiment of a glass forming apparatus 10 for forming a glass ribbon 12 is schematically depicted. The glass forming apparatus 10 generally includes a melting vessel 15 configured to receive batch material 16 used to form glass from a storage bin 18. The batch material 16 can be introduced to the melting vessel 15 by a batch delivery device 20 powered by a motor 22. An optional controller 24 may be provided to activate the motor 22 and a molten glass level probe 28 can be used to measure the glass melt level within a standpipe 30 and communicate the measured information to the controller 24.

The glass forming apparatus 10 includes a fining vessel 38 located downstream from the melting vessel 15 and coupled to the melting vessel 15 by way of a first connecting tube 36. A mixing vessel 42 is located downstream from the fining vessel 38. A delivery vessel 46 may be located downstream from the mixing vessel 42. As depicted, a second connecting tube 40 couples the fining vessel 38 to the mixing vessel 42 and a third connecting tube 44 couples the mixing vessel 42 to the delivery vessel 46. As further illustrated, a downcomer 48 is positioned to deliver glass melt from the delivery vessel 46 to an inlet 50 of a forming vessel 60.

The melting vessel 15 is typically made from a refractory material, such as refractory (e.g., ceramic) brick. The glass forming apparatus 10 may further include components that are typically made from platinum or platinum-containing metals such as platinum-rhodium, platinum-iridium and combinations thereof, but which may also comprise such refractory materials such as molybdenum, palladium, rhenium, tantalum, titanium, tungsten, ruthenium, osmium, zirconium, and alloys thereof and/or zirconium dioxide. The platinum-containing components can include one or more of the first connecting tube 36, the fining vessel 38, the second connecting tube 40, the standpipe 30, the mixing vessel 42, the third connecting tube 44, the delivery vessel 46, the downcomer 48 and the inlet 50. The forming vessel 60 can also be made from a refractory material and is designed to form the glass melt into a glass ribbon 12.

Figure 2:
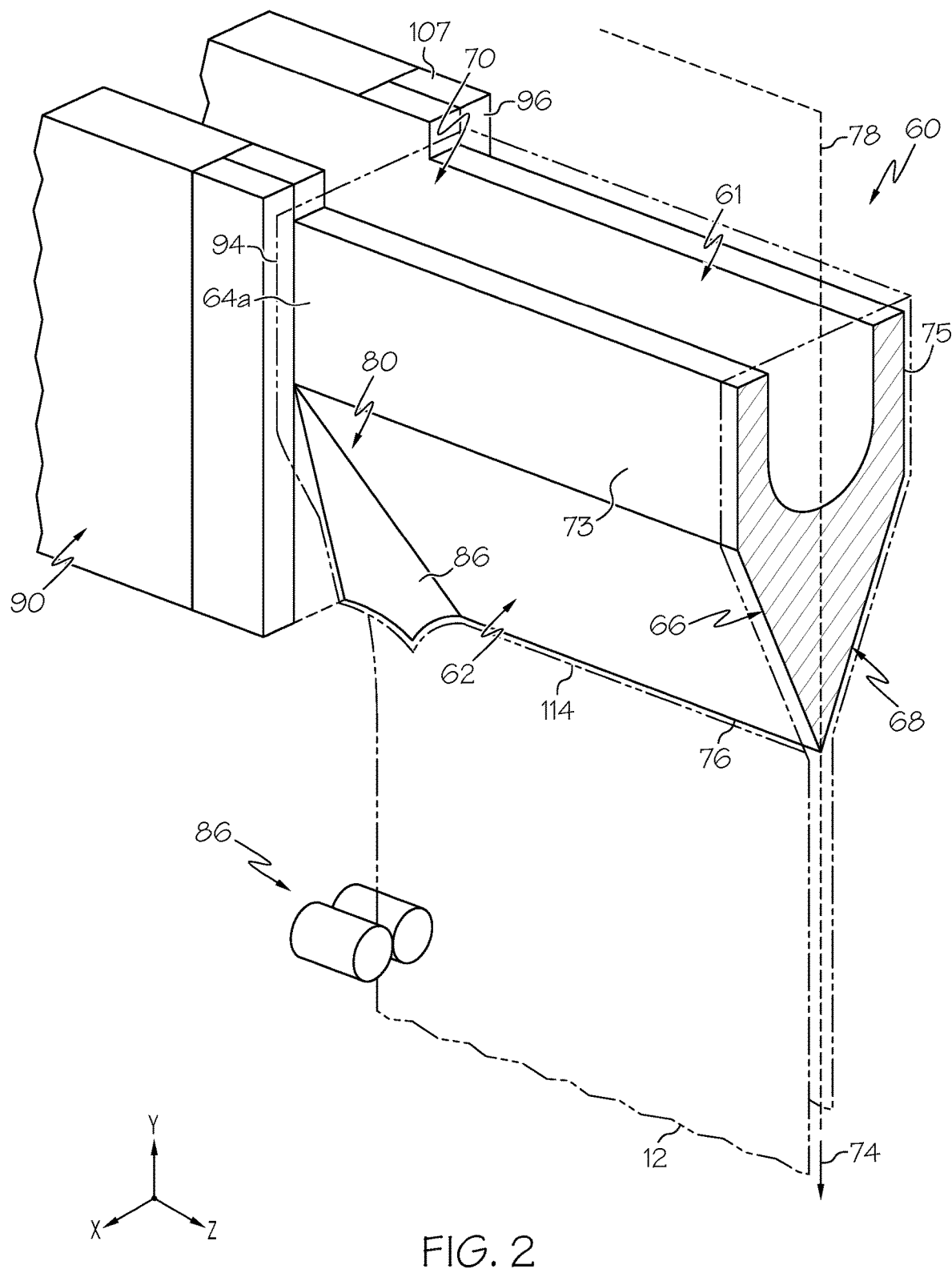
FIG. 2 schematically depicts a cross sectional perspective view along line 2-2 of FIG. 1.

FIG. 2 is a cross sectional perspective view of the glass forming apparatus 10 along line 2-2 of FIG. 1. As shown, the forming vessel 60 includes a forming wedge portion 62 and an open upper portion 61. The upper portion 61 includes parallel outside surface portions 73, 75, and the forming wedge portion 62 includes a pair of downwardly (i.e., in the −y direction of the coordinate axes depicted in FIG. 2) inclined forming surface portions 66, 68 that extend between opposite ends 70, 72 of the forming vessel 60. The downwardly inclined forming surface portions 66, 68 converge along a downstream direction 74 to form a bottom edge or root 76. The root 76 is a boundary where the downwardly inclined forming surface portions 66 and 68 meet or converge. A draw plane 78 extends through the root 76. The glass ribbon 12 may be drawn from the forming wedge portion 62 in the downstream direction 74 along the draw plane 78. As depicted, the draw plane 78 bisects an angle σ formed between inclined forming surface portions 66 and 68 and extends through the root 76. However, it should be understood that the draw plane 78 may extend at other various orientations with respect to the root 76 other than bisecting the angle σ. While FIGS. 1 and 2 generally depict one embodiment of a glass forming apparatus and a forming vessel, it should also be understood that aspects of the present disclosure may be used with various other forming vessel configurations.

Referring to FIGS. 1 and 2, in some embodiments, each opposed end 70, 72 of the forming vessel 60 can be provided with retaining block assemblies 90 and 92. Vertically-oriented, planar surfaces 94 and 96 are provided that intersect both of the parallel outside surface portions 73, 75 and the downwardly inclined forming surface portions 66, 68. The respective surfaces 94, 96 (FIG. 2) can serve as vertical support surfaces for edge directors 80 and 82 that provide lateral barriers on opposite sides of the glass ribbon 12. The surfaces 94 and 96 with edge directors 80 and 82 are used in limiting migration of the glass ribbon and directing the glass ribbon downwardly toward the root 76. As can be seen particularly by FIG. 2, the surfaces 94 and 96 may extend the entire height or even beyond the entire height of the forming wedge portion 62 (i.e., extend beyond both the root 76 and the upper portion 61 in the y direction).

The forming vessel 60 includes the pair of edge directors 80 and 82 each intersecting with the outside surface portions 73 and 75 (see FIG. 2) and the pair of downwardly inclined forming surface portions 66, 68. The edge directors 80, 82 help achieve a desired glass ribbon width and edge characteristics by directing the molten glass proximate to the root 76 of the forming vessel 60. In further embodiments, the edge directors 80 and 82 can intersect with both downwardly inclined forming surface portions 66, 68. In addition, the edge directors 80, 82 can be positioned at each of the opposite ends 70, 72 of the forming wedge portion 62. For instance, as shown in FIG. 1, the edge director 80, 82 can be positioned at each of the opposite ends 70, 72 of the forming wedge portion 62 with each edge director 80, 82 configured to intersect with both of the downwardly inclined forming surface portions 66, 68. The edge directors 80 and 82 also extend vertically along respective surfaces 94 and 96 forming dams. Each edge director 80, 82 may be substantially identical to one another. However, it should be understood that, in alternative embodiments, the edge directors 80, 82 may have different configurations and/or geometries depending on the specific characteristics of the glass forming apparatus. The edge directors 80 and 82 will be described in greater detail below.

Still referring to FIG. 1, the glass forming apparatus 10 can optionally include at least one edge roller assembly 86 for drawing glass ribbon from the root 76 of the forming vessel 60. It should be understood that various edge roller assembly configurations may be used in accordance with aspects of the present disclosure.

A housing 14 encloses the forming vessel 60. The housing 14 may be formed from steel and contain refractory material and/or insulation to thermally insulate the forming vessel 60, and the molten glass flowing in and around the forming vessel 60, from the surrounding environment.

Referring again to FIGS. 1 and 2, in operation, batch material 16, specifically batch material for forming glass, is fed from the storage bin 18 into the melting vessel 15 with the batch delivery device 20. The batch material 16 is melted into molten glass in the melting vessel 15. The molten glass passes from the melting vessel 15 into the fining vessel 38 through the first connecting tube 36. Dissolved gasses, which may result in glass defects, are removed from the molten glass in the fining vessel 38. The molten glass then passes from the fining vessel 38 into the mixing vessel 42 through the second connecting tube 40. The mixing vessel 42 homogenizes the molten glass, such as by stirring, and the homogenized molten glass passes through the third connecting tube 44 to the delivery vessel 46. The delivery vessel 46 discharges the homogenized molten glass through downcomer 48 and into the inlet 50 which, in turn, passes the homogenized molten glass into the upper portion 61 of the forming vessel 60.

As molten glass 17 fills the upwardly open upper portion 61 of forming vessel 60, it overflows the upper portion 61 and flows over the inclined forming surface portions 66, 68 and rejoins at the root 76 of the forming wedge portion 62, thereby forming a glass ribbon 12. As depicted in FIG. 2, the glass ribbon 12 may be drawn in the downstream direction 74 along the draw plane 78 that extends through the root 76.

Figure 3:
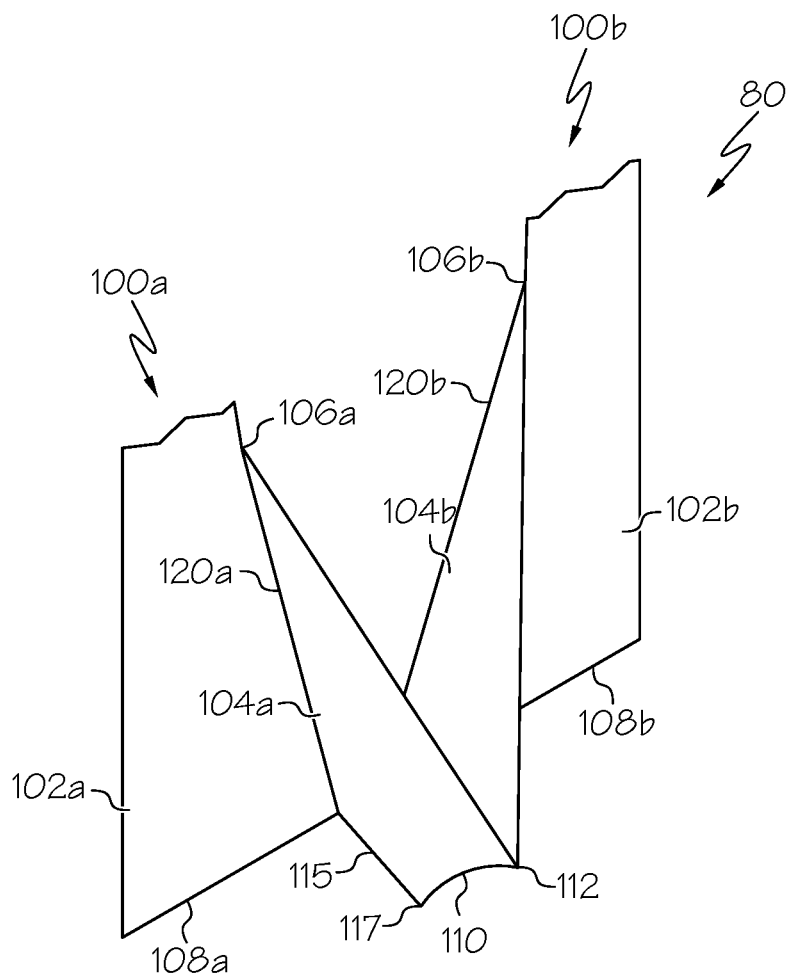
FIG. 3 is a side, perspective view of an edge director for use with the apparatus of FIG. 1, according to one or more embodiments shown and described herein.

Referring now to FIG. 3, the edge director 80 is illustrated in isolation and generally includes edge director portions 100a and 100b. Referring first to edge director portion 100a, the edge director portion 100a includes a flow directing portion 104a that is connected to a flow blocking portion 102a (e.g., by welding). The flow blocking portion 102a (sometimes referred to as a dam) may be, for example, the surface 94 of the retaining block assembly 90. In some embodiments, the flow blocking portion 102a may be part of the edge director portion 100a and connected to the surface 94 of the retaining block assembly 90. The flow blocking portion 102a is generally planar and is shaped to extend alongside the retaining block assembly 90. While only a portion of a height of the flow blocking portion 102a is illustrated by FIG. 3, the flow blocking portion 102a may extend to or even beyond a top 107 of the retaining block assembly 90 (FIG. 2). The flow directing portion 104a extends outwardly from the flow blocking portion 102a and generally toward the downwardly inclined forming surface portion 66. The flow directing portion 104a can extend outwardly from the flow blocking portion 102a in an increasing fashion from a top 106a of the flow directing portion 104a toward a bottom 108a of the flow blocking portion 102a thereby forming a ramped flow directing portion 104a of increasing length that increases in a direction outward toward the center of the forming vessel 60 from the flow blocking portion 102a from the top 106a to the bottom 108a.

Similarly, the edge director portion 100b includes a flow directing portion 104b that is connected to a flow blocking portion 102b (e.g., by welding). The flow blocking portion 102b (sometimes referred to as a dam) may, for example, be the surface 96 of the retaining block assembly 90. In some embodiments, the flow blocking portion 102b may be part of the edge director portion 100b and connected to the surface 96 of the retaining block assembly 90. The flow blocking portion 102b is generally planar and is shaped to extend alongside the retaining block assembly 90. While only a portion of a height of the flow blocking portion 102a is illustrated by FIG. 3, the flow blocking portion 102a may extend to or even beyond the top 107 of the retaining block assembly 90 (FIG. 2). The flow directing portion 104b extends outwardly from the flow blocking portion 102b and generally toward the downwardly inclined forming surface portion 66. The flow directing portion 104b can extend outwardly from the flow blocking portion 102b in an increasing fashion from a top 106b of the flow directing portion 104b toward a bottom 108b of the flow blocking portion 102b thereby forming a ramped flow directing portion 104b of increasing length that increases in a direction outward toward the center of the forming vessel 60 from the flow blocking portion 102b from the top 106b to the bottom 108b.

The edge director portion 100a and the edge director portion 100b are connected together at the root 76 of the forming wedge portion 62. In particular, the flow directing portion 104a and the flow directing portion 104b extend toward one another to meet at an immersion edge 110. The immersion edge 110 extends outwardly toward the center of the forming vessel 60 to an immersion point 112. The immersion edge 110 can have both a horizontal and a vertical component, extending downwardly from the immersion point 112 to tail portions 115. Although not shown by FIG. 3, each flow directing portion includes a tail portion 115 that diverge from one another, away from the immersion edge toward the flow blocking portion 102. The tail portions 115 extend outwardly from the bottom 108 toward the center of the forming vessel 60 to an intersection 117 with the immersion edge 110. Thus, the immersion edge 110 and the tail portions 115 may affect the shape of the root line from a straight, horizontal root line portion to a root line having down turned edges, as represented by dotted line 114 in FIG. 2.

Figure 4:
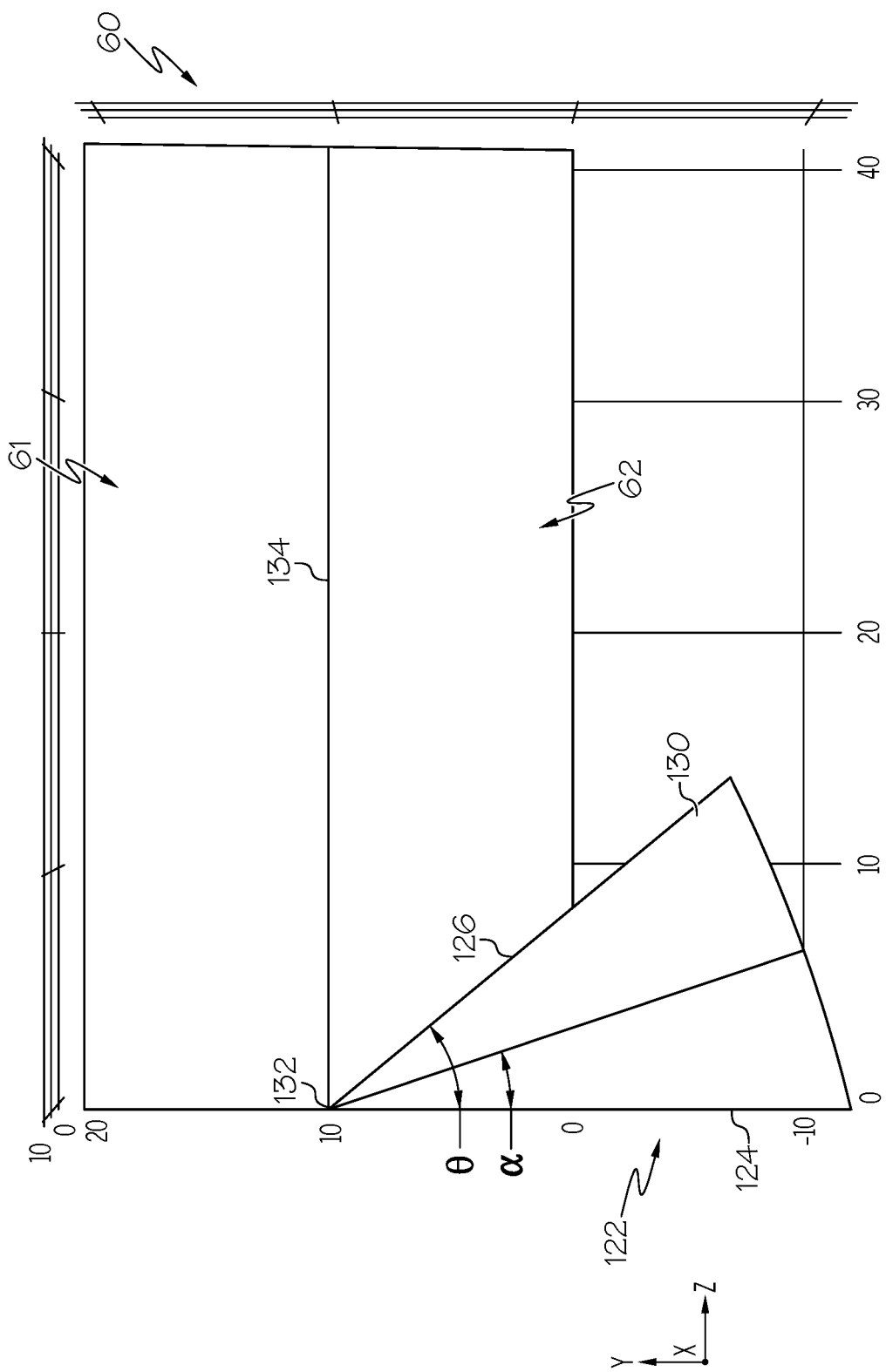
FIG. 4 illustrates a method of forming an edge director, according to one or more embodiments shown and described herein.
Figure 5:
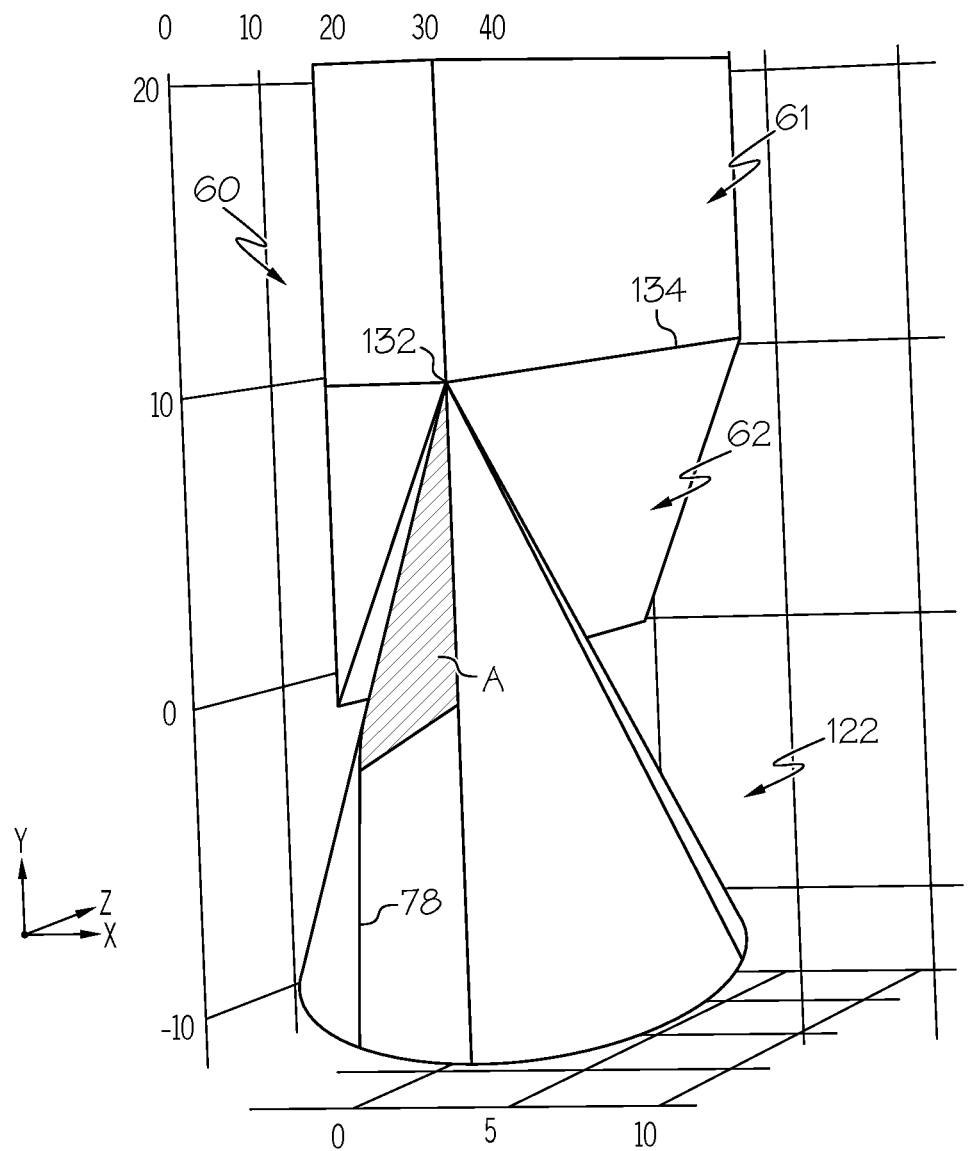
FIG. 5 illustrates a method of forming an edge director, according to one or more embodiments shown and described herein.
Figure 6:
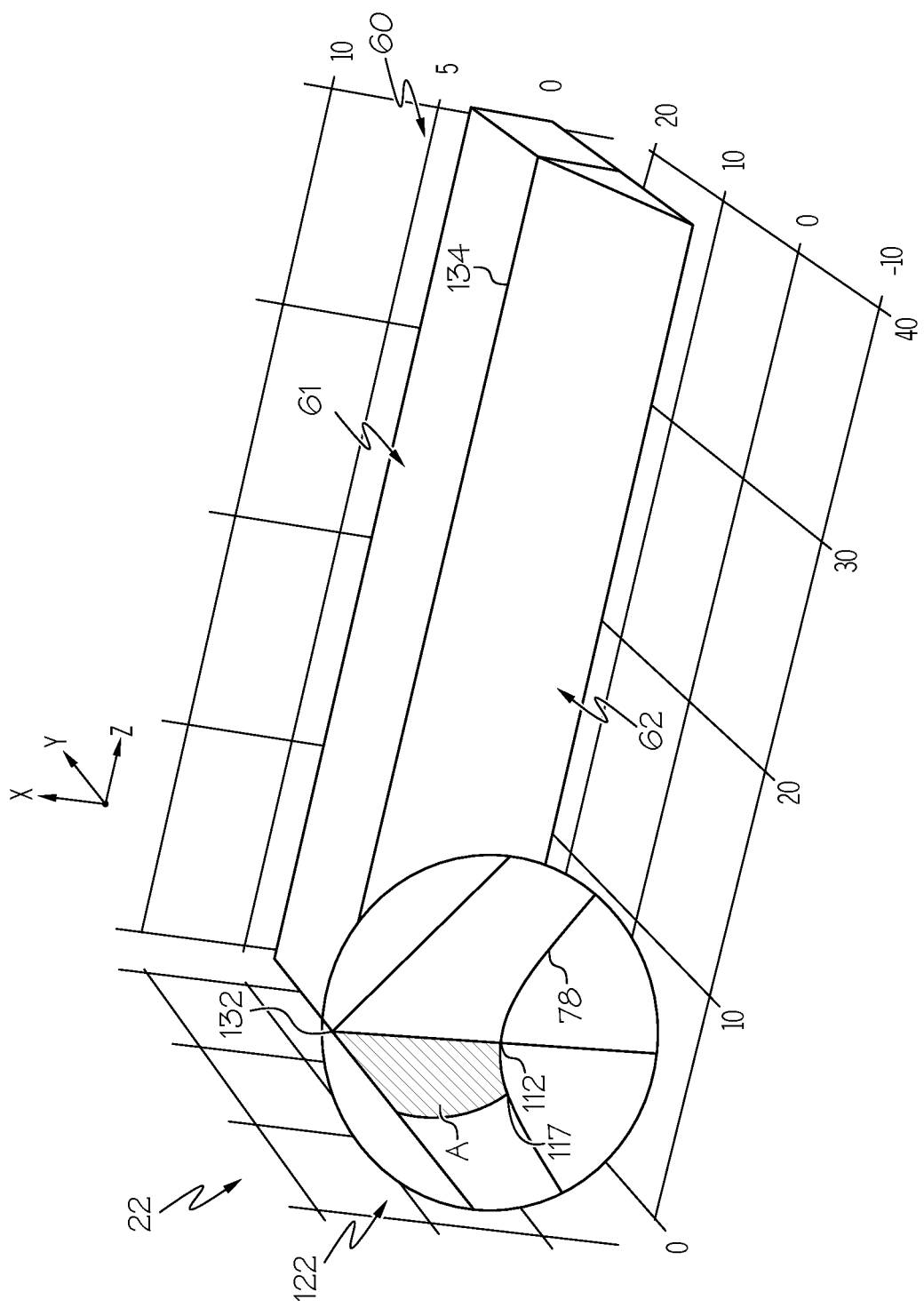
FIG. 6 illustrates a method of forming an edge director according to one or more embodiments shown and described herein.

The flow directing portions 104a and 104b may be curved from edges 120a and 120b that intersect the flow blocking portions 104a and 104b inward toward the center of the root to the immersion edge 110. In particular, referring to FIGS. 4-6, the shape of the flow directing portions 104 may be defined by the shape of a cone of a preselected dimension, represented by element 122. In the example of FIGS. 4-6, the cone 122 is selected to have a predetermined cone angle $\alpha$, which is one half of an apex angle $\theta$ that is measured between opposite sides 124 and 126 of the cone 122. In other words, the cone angle $\alpha$ is the angle between the central axis of the cone 122 and cone surface 130. As can be appreciated, in the limit of cone angles approaching zero, the cone 122 approaches a line and in the limit of cone angles approaching 90 degrees, the cone 122 approaches a plane. As used herein, the term "large cone angle" refers to cone angles of greater than 20 degrees to form large cone edge directors (LCEDs). While a conical shape is described primarily below, frustoconical shapes may be used.

Figure 9:
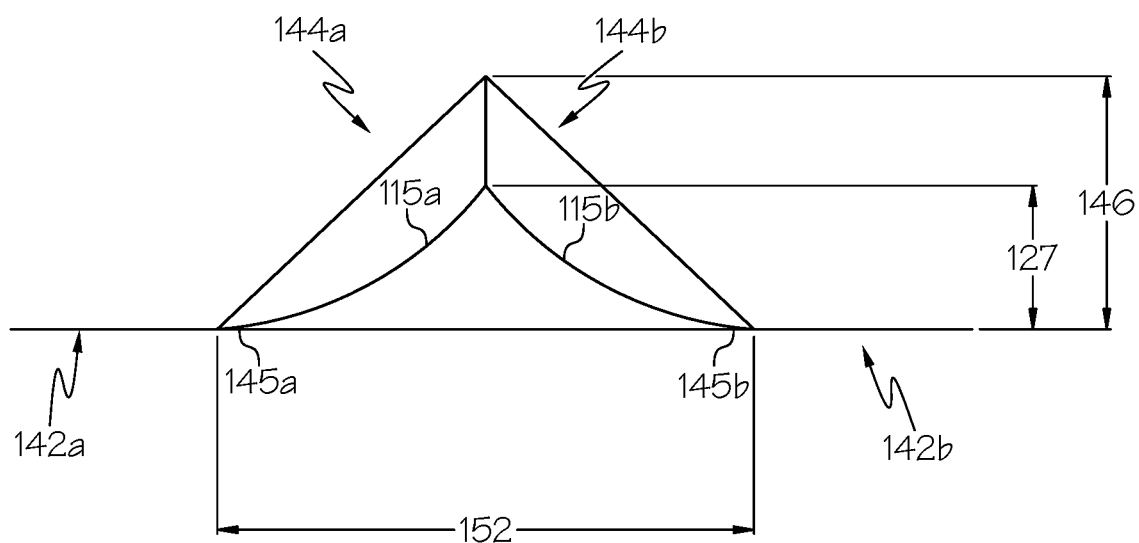
FIG. 9 is a bottom view of the edge director of FIG. 7.

Referring first to FIG. 4, the cone 122 is selected to have a preselected cone angle $\alpha$. To generate a flow directing portion shape, an apex 132 of the cone 122 is placed at where an intersection 134 between the forming wedge portion 62 and the open upper portion 61 intersects the dam or flow blocking portion 102. The cone 122 extends downward in height to below the root 76. The flow blocking portion 102 is removed for clarity. The cone 122 is tilted about the z-axis with the apex 132 fixed to a preselected immersion depth (see element 146 of FIG. 9), which is the distance between the immersion point 112 and the flow block portion 102 shown in FIG. 3. Referring to FIGS. 5 and 6, the cone 122 is then rotated about the x-axis with the apex 132 again fixed to a preselected angle of intersection with the inclined forming surface portion 66 (e.g., between 2 degrees and 10 degrees). The cone 122 is cut below the dam with the draw plane 78 (FIG. 2) so that a tail depth 127 (see FIG. 9) is a preselected percentage of the height of the forming vessel 60 (e.g., between 10 percent and 30 percent). The tail depth 127 is the distance in the z-direction from the flow blocking portion 102 and the intersection point 117 with the immersion edge 110. The height of the forming vessel is the vertical distance from the root to the intersection 134 between the forming wedge portion 62 and the open upper portion 61. What is left of the cone is represented by the shaded area A, which corresponds to an arc portion of a frustoconical or conical shape defining a flow directing portion 104 derived from a frustoconical or conical shape of a given cone angle.

Figure 7:
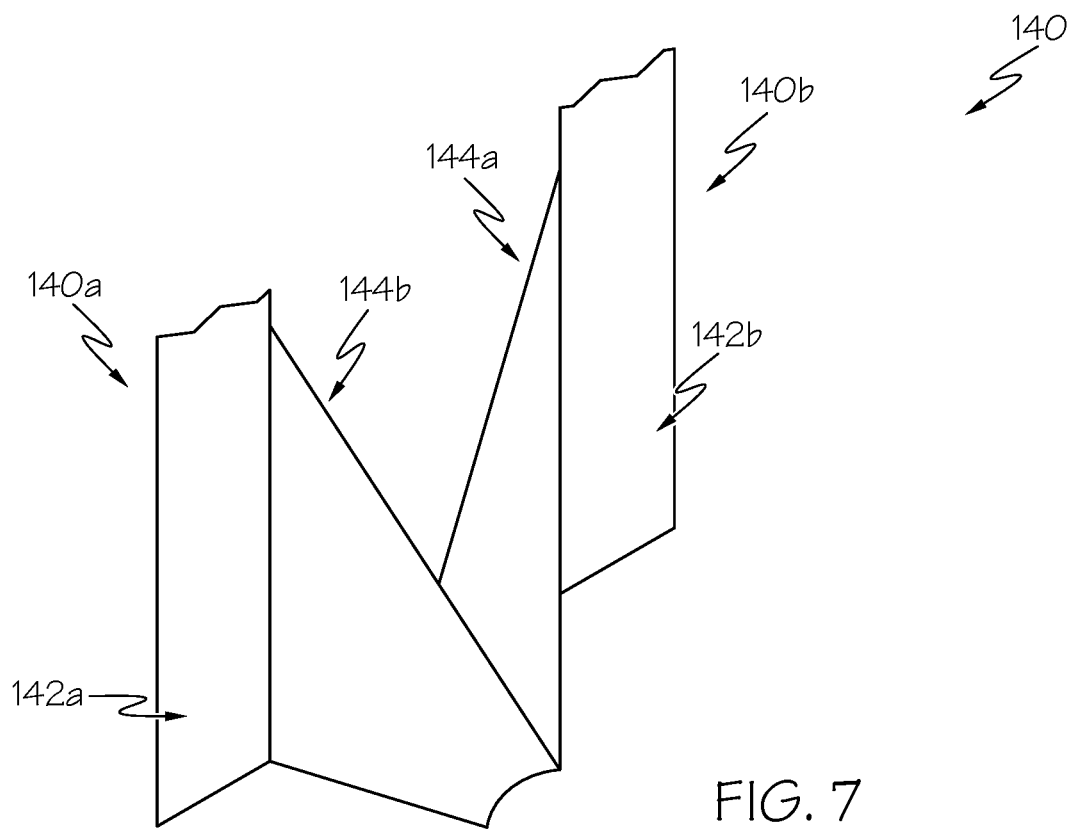
FIG. 7 is a side, perspective view of an edge director, according to one or more embodiments shown and described herein.
Figure 8:
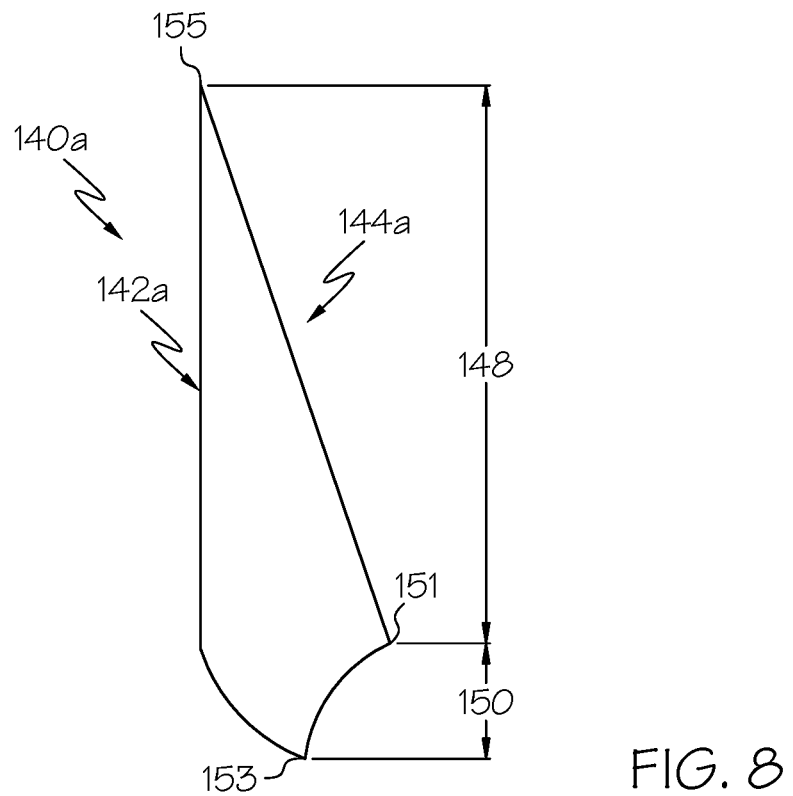
FIG. 8 is a side view of the edge director of FIG. 7.

Referring to FIG. 7, an edge director 140 is illustrated in isolation. The edge director 140 includes connected edge director portions 140a and 140b in a fashion similar to that described above regarding edge director 80. The edge director 140 includes flow directing portions 144a and 144b. The flow directing portions 144a and 144b may intersect flow blocking portions 142a and 142b. The flow blocking portions 142a and 142b may be, for example, the surfaces 94 and 96 of the retaining block assembly 90 (FIG. 2). For simplicity, only the flow blocking portions 144a and 144b are represented by FIGS. 7-10 without the retaining block assembly 90.

Figure 10:
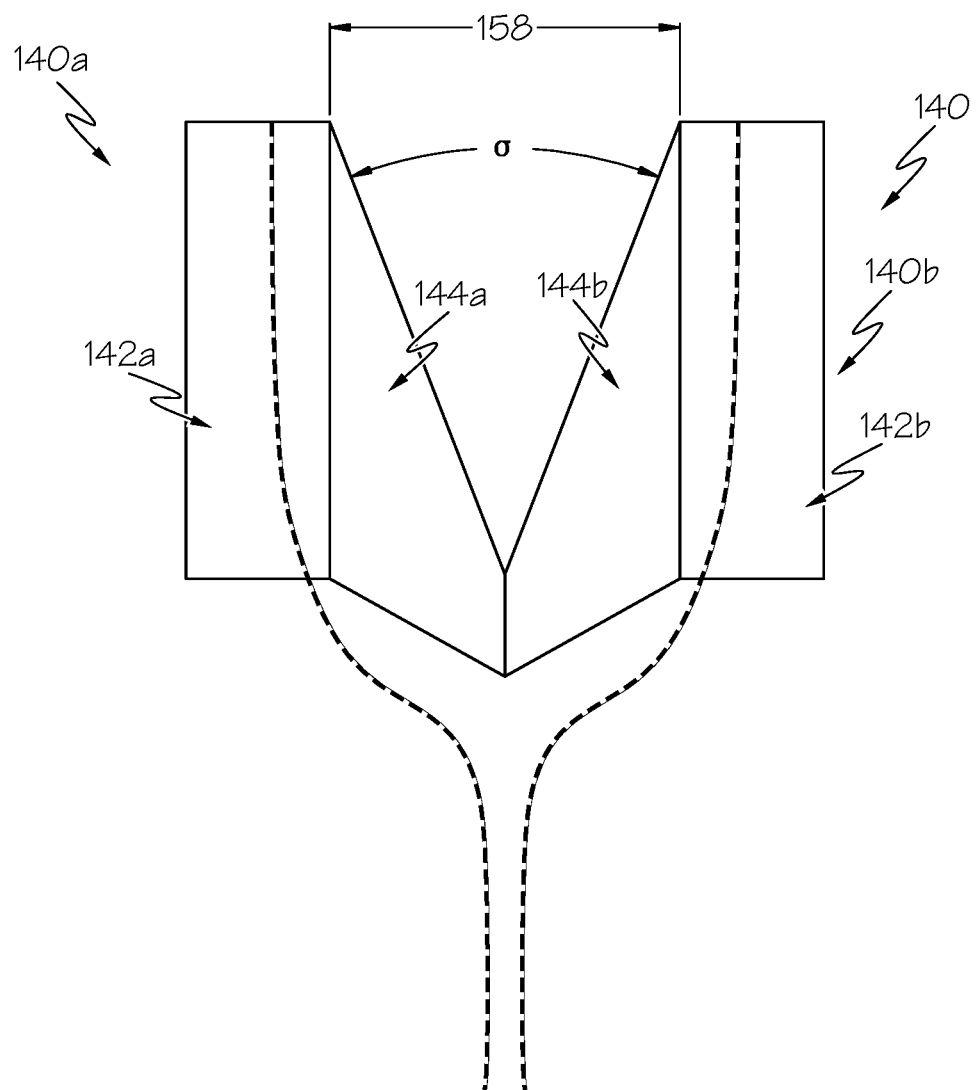
FIG. 10 is a front view of the edge director of FIG. 7.
Figure 11:
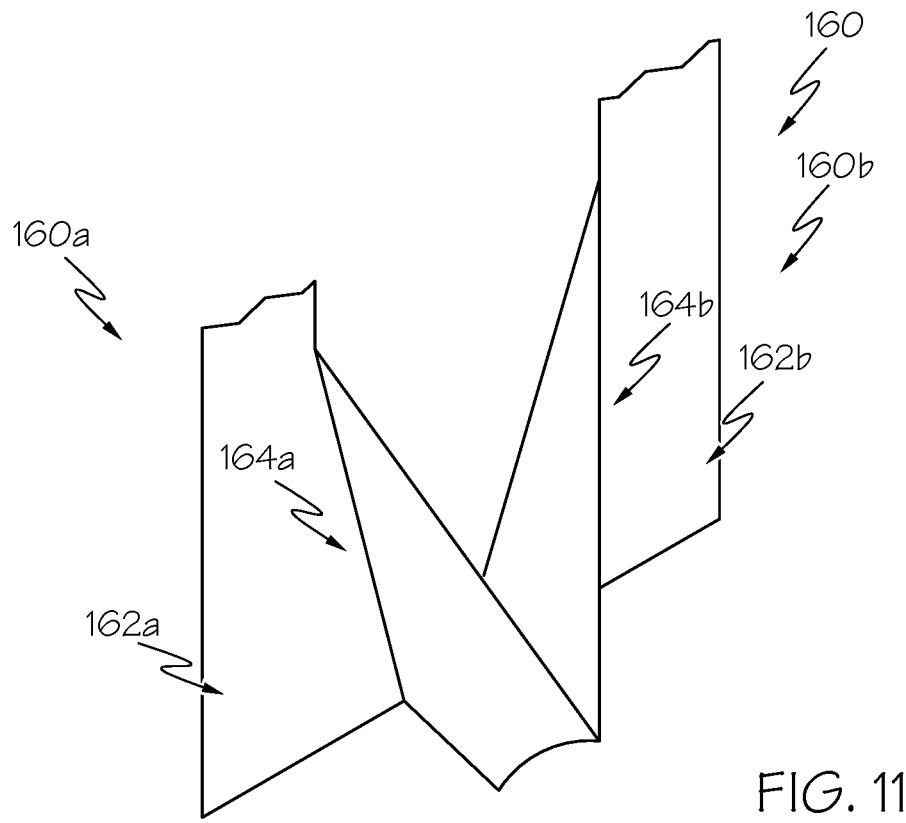
FIG. 11 is a side, perspective view of an edge director, according to one or more embodiments shown and described herein.

The flow directing portions 144a and 144b are formed as described above from cones having a preselected cone angle. In this embodiment, the flow directing portions 144a, 144b are formed from cones having a cone angle of less than 20 degrees, such as 19.81 degrees. A cone angle of 19.81 degrees provides an immersion depth 146 (FIG. 9) to height 148 of the forming wedge portion, which is the vertical distance from the immersion point 151 to the apex 155 of 0.37. The cone angle of 19.81 degrees also provides a tail height 150 (FIG. 8), which is the vertical distance between the intersection point 153 and the immersion point 151, to height 148 of the forming wedge portion of 0.22. Knowing coordinates for the apex 155, the immersion point 151 and the intersection point 153, the cone angle $\alpha$ can be determined. As can be best seen by FIG. 9, the flow directing portions 144a and 144b are tangent to the flow blocking portions 142a and 142b at intersections 145a and 145b, providing a relatively wide edge director width 152 of the same width 158 (FIG. 10) as the forming vessel compared to LCEDs. "Edge director width" refers to a distance between lowermost intersections 145a and 145b along the flow blocking portions 142a, 142b where the tail portions 115 intersect the flow blocking portions 142a, 142b. As used herein, the term "tangent" refers to an angle of intersection of less than 10 degrees. Dashed lines 154 and 156 of FIG. 10 are illustrative of glass flow path illustrating edges of the glass flow converging at the root under steady-state operating conditions.

Without wishing to be bound by theory, it is believed that providing relatively narrow cone widths can provide improved stability and bead quality compared to wide cone widths. LCEDs can provide such narrower cone widths by intersecting the dams or flow blocking portions in a non-tangential fashion, while being tangent or nearly tangent with the flow directing portions of the forming vessel due to the increased cone angle.

Figure 12:
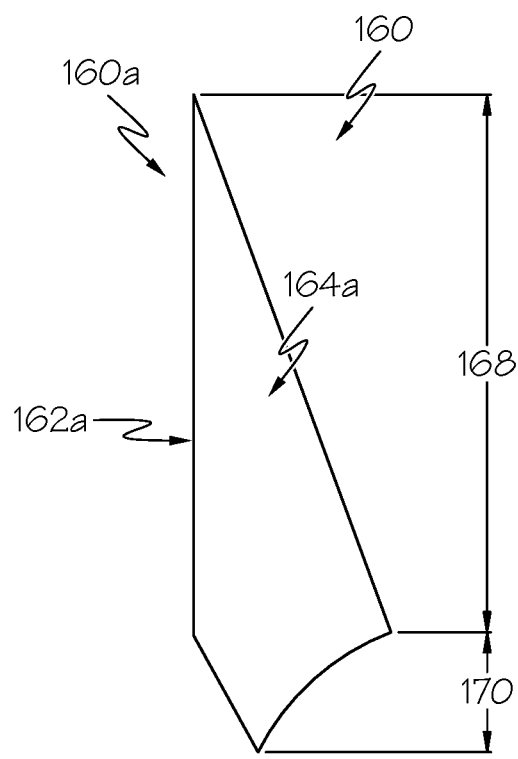
FIG. 12 is a side view of the edge director of FIG. 11.
Figure 13:
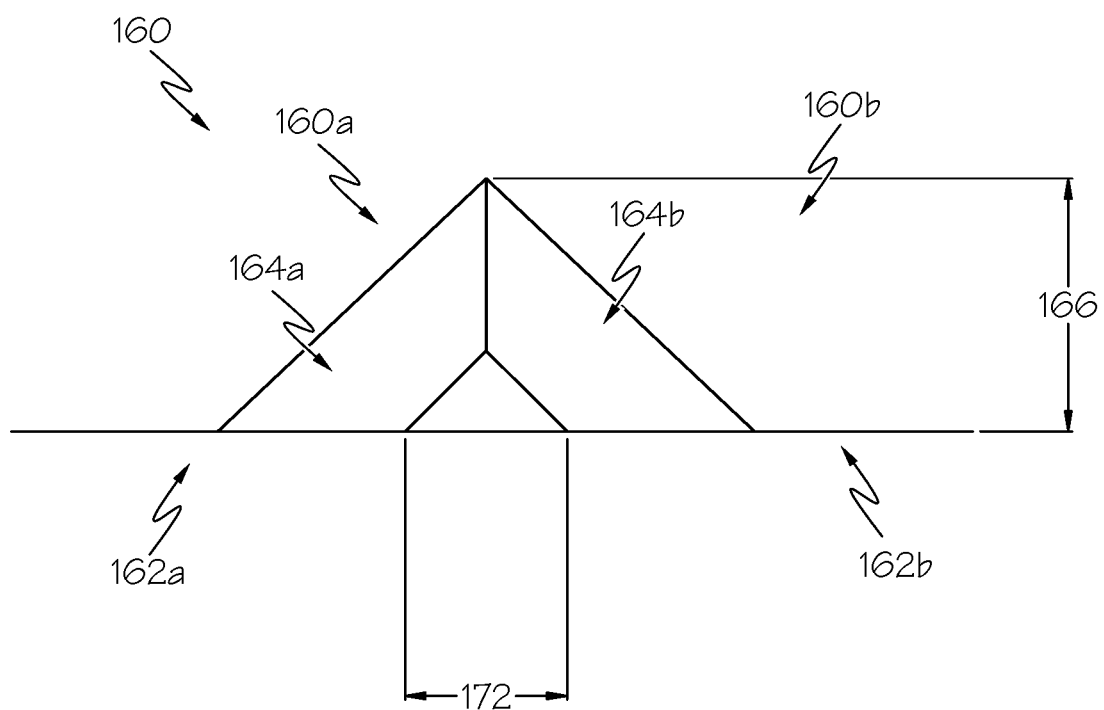
FIG. 13 is a bottom view of the edge director of FIG. 11.
Figure 14:
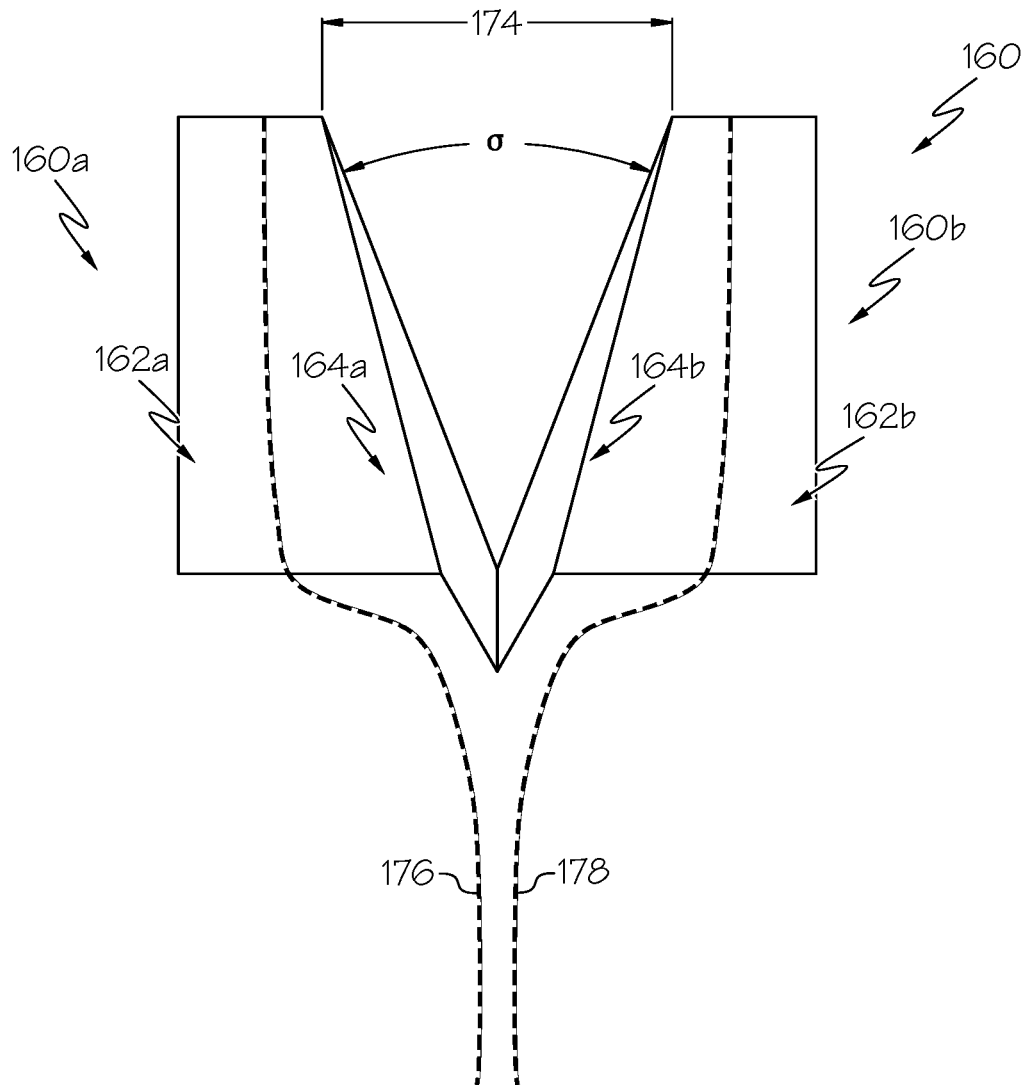
FIG. 14 is a front view of the edge director of FIG. 11.
Figure 15:
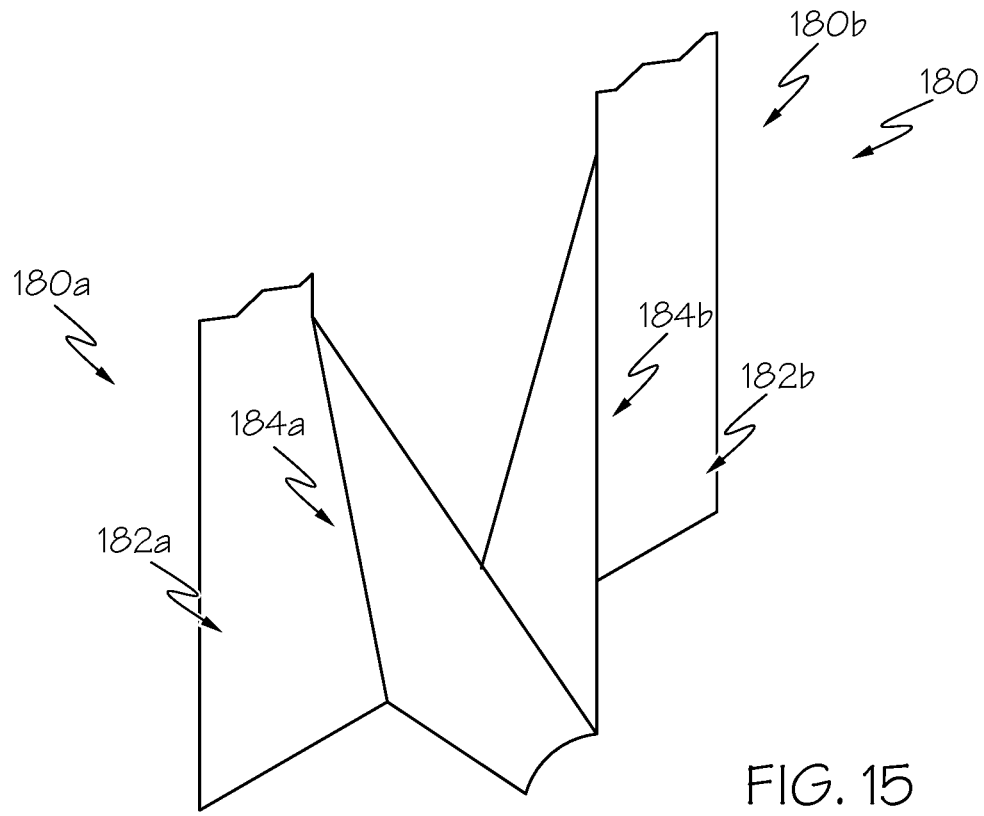
FIG. 15 is a side, perspective view of an edge director, according to one or more embodiments shown and described herein.

Referring to FIGS. 11-14, for example, another edge director 160 includes edge director portions 160a and 160b with flow directing portions 164a and 164b and flow blocking portions 162a and 162b. In this embodiment, however, the flow directing portions 164a and 164b are each formed using a cone of increased cone angle compared to FIGS. 7-10. In this embodiment, the flow directing portions 164a and 164b are each formed using a cone having a cone angle of 40.08 degrees. Referring to FIGS. 12 and 13, an immersion depth 166 is maintained at 37 percent of a height 168 of the forming wedge portion and a tail height 170 to the height 168 of the forming wedge portion is maintained at 0.22, like the edge director 140 of FIGS. 7-10. Unlike the edge director 140, an edge director width 172 of the edge director 160 is substantially narrower than a width 174 (FIG. 14) of the forming vessel at the open upper portion. In particular, a ratio of edge director width 172 to width 174 of the forming vessel is 0.30. Dashed lines 176 and 178 of FIG. 14 are illustrative of glass flow path illustrating edges of the glass flow converging at the root 76 under steady-state operating conditions.

Figure 16:
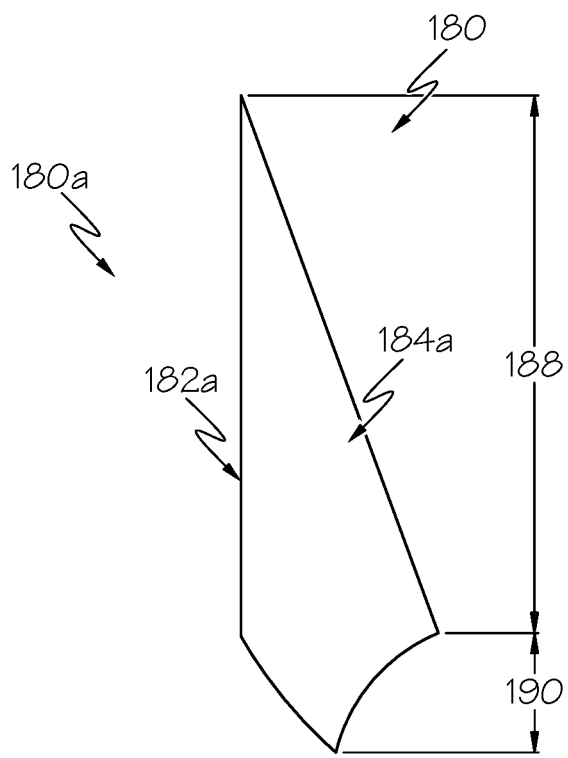
FIG. 16 is a side view of the edge director of FIG. 15.
Figure 17:
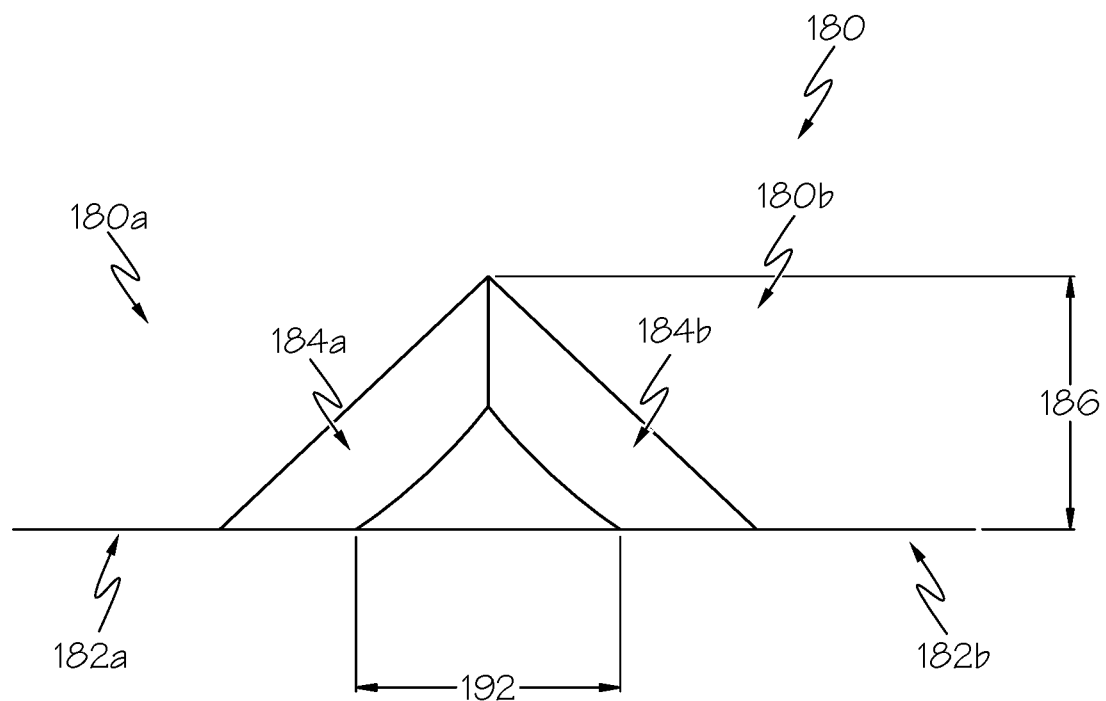
FIG. 17 is a bottom view of the edge director of FIG. 15.
Figure 18:
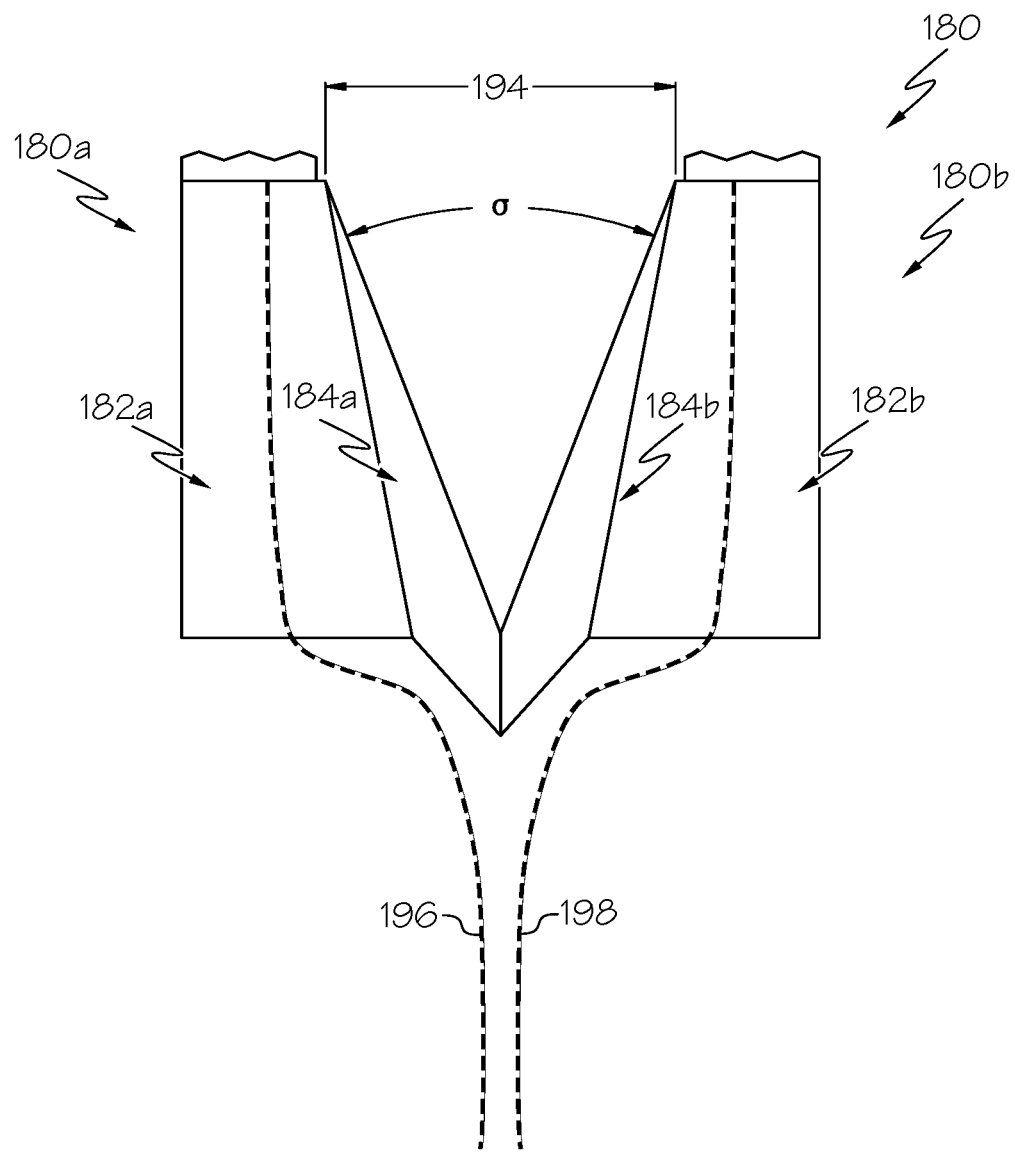
FIG. 18 is a front view of the edge director of FIG. 15.

Referring to FIGS. 15-18, another edge director 180 includes edge director portions 180a and 180b with flow directing portions 184a and 184b and flow blocking portions 182a and 182b. In this embodiment, the flow directing portions 184a and 184b are each formed using a cone of increased cone angle compared to FIGS. 7-10, but of lower cone angle compared to FIGS. 11-14. In this embodiment, the flow directing portions 184a and 184b are each formed using a cone having a cone angle of 25.90 degrees. Referring to FIGS. 16 and 17, an immersion depth 186 is maintained at 37 percent of a height 188 of the forming wedge portion and a tail height 190 to the height 188 of the forming wedge portion is maintained at 0.22. A edge director width 192 of the edge director 180 is also substantially narrower than a width 194 (FIG. 18) of the forming vessel at the open upper portion. In particular, a ratio of edge director width 192 to width 194 of the forming vessel is 0.50. Dashed lines 196 and 198 of FIG. 18 are illustrative of glass flow path illustrating edges of the glass flow converging at the root 76 under steady-state operating conditions.

The Table below provides ratios of edge director width to width of the forming vessel for a number of exemplary cone angles. The Table is generated assuming a zero thickness cone. As can be seen, the ratio of edge director width to width of the forming vessel decreases with increasing cone angle.

TABLE

Ratio of Cone Width to Width of Forming Vessel

| Ratio of Edge Director Width to Width of Forming Vessel | Cone Angle in Degrees |
| --- | --- |
| 0.20 | 57.78 |
| 0.25 | 47.47 |
| 0.30 | 40.08 |
| 0.40 | 30.90 |
| 0.50 | 25.88 |
| 0.60 | 23.00 |
| 0.70 | 21.33 |
| 0.80 | 20.39 |
| 0.90 | 19.93 |
| 1.00 | 19.81 |

Figure 19:
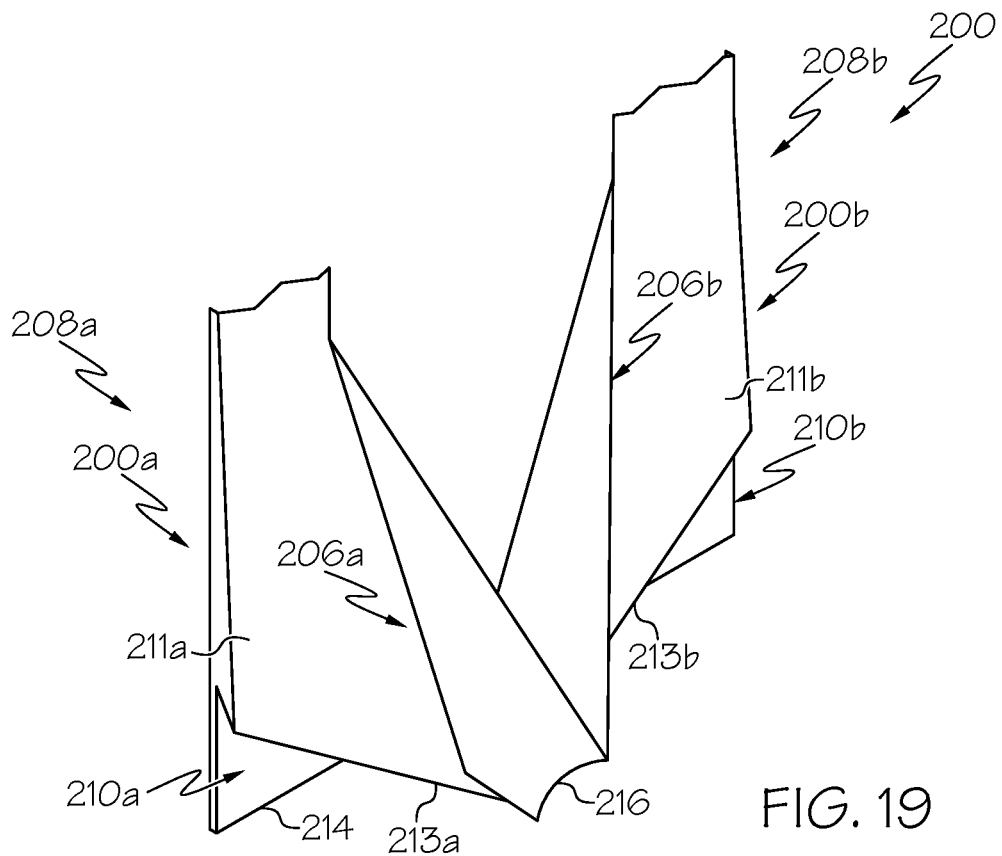
FIG. 19 is a side, perspective view of an edge director, according to one or more embodiments shown and described herein.

Referring now to FIGS. 19-22, in addition to larger cone angles, the LCEDs may be provided with additional flow control features. FIG. 19 illustrates a variation of the edge director 180 that includes pedestal structures 208a and 208b. Again, this edge director 200 includes edge director portions 200a and 200b with flow directing portions 206a and 206b each derived from a cone having a cone angle of 25.9 degrees and a ratio of cone width 208 to width 210 of forming vessel of 0.5.

Figure 20:
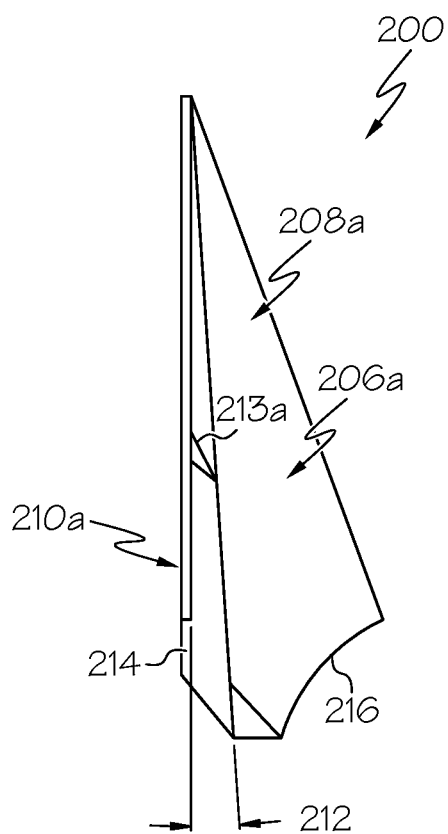
FIG. 20 is a side view of the edge director of FIG. 19.
Figure 21:
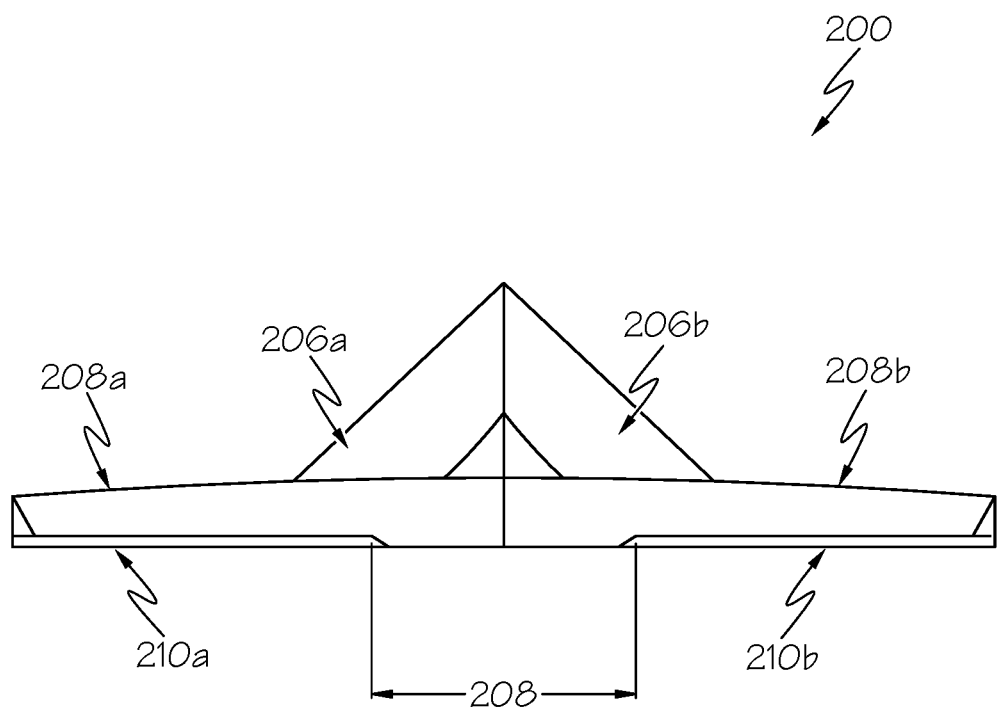
FIG. 21 is a bottom view of the edge director of FIG. 19.
Figure 22:
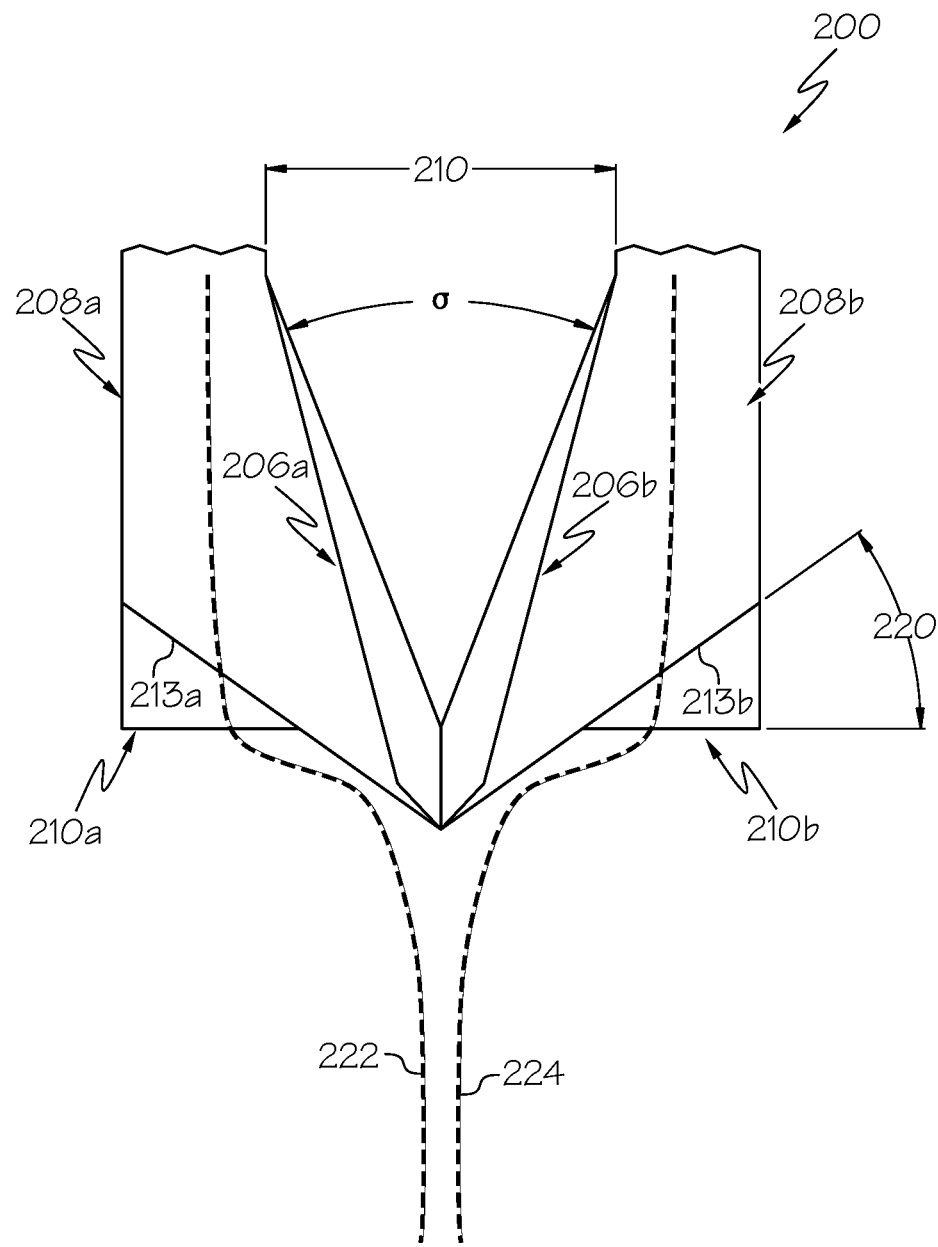
FIG. 22 is a front view of the edge director of FIG. 19.

In this example, each director portion 200a and 200b is provided with a pedestal structure 208a and 208b that extends out of planes of flow blocking portions 210a and 210b. Referring to FIG. 20, the pedestal structures 208a, 208b may extend outwardly from the plane of the flow blocking portions 210a and 210 at a preselected pedestal incline angle 212 (e.g., of between 2 degrees and 10 degrees, such as about 4 degrees) measured from the vertical flow blocking portions 210a and 210b to surfaces 211a and 211b of the pedestal structures 208a and 208b. Further, the pedestal structures 208a and 208b may terminate along edges 213a and 213b at a location spaced from a bottom 214 of the flow blocking portions 210a and 210b and extend downwardly to immersion edge 216 at a pedestal cut angle 220 (e.g., of between 20 degrees and 45 degrees, such as 35 degrees) measured from horizontal as shown by FIG. 22. The pedestal structures 208a and 208b direct glass flow toward the fusion plane. Dashed lines 222 and 224 of FIG. 22 are illustrative of glass flow path illustrating edges of the glass flow converging at the root 76 under steady-state operating conditions.

Figure 23:
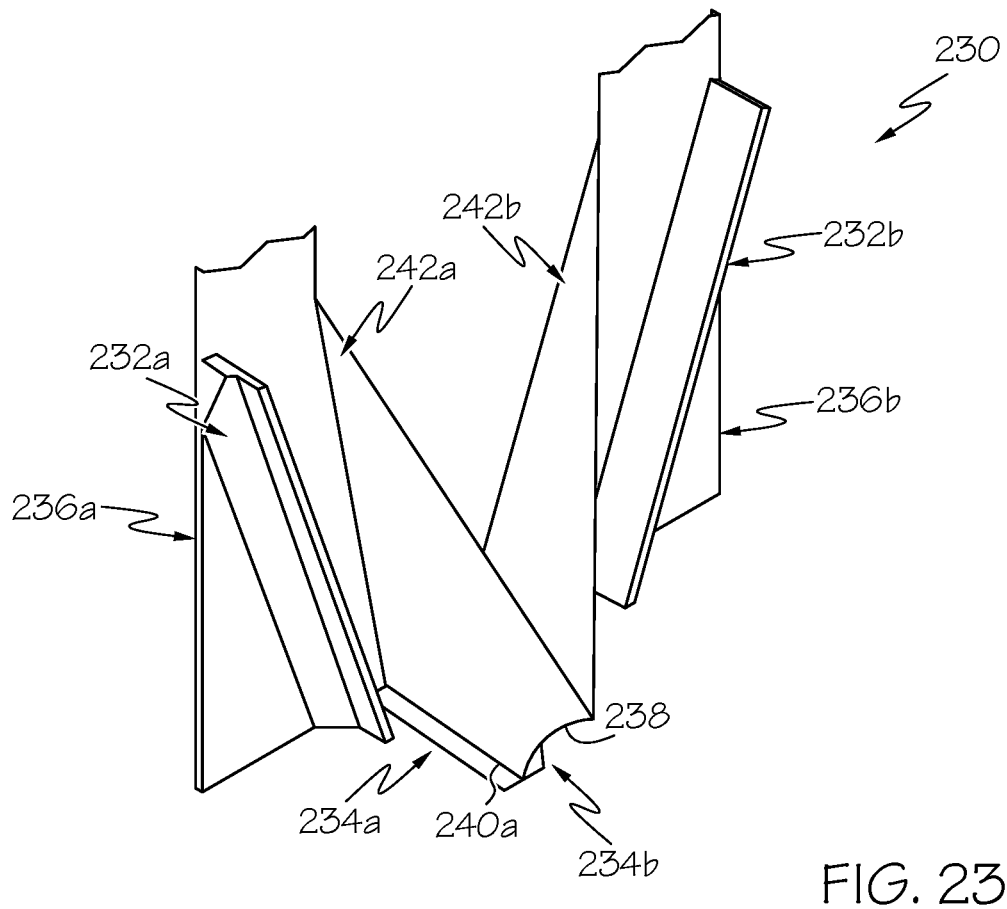
FIG. 23 is a side, perspective view of an edge director, according to one or more embodiments shown and described herein.
Figure 24:
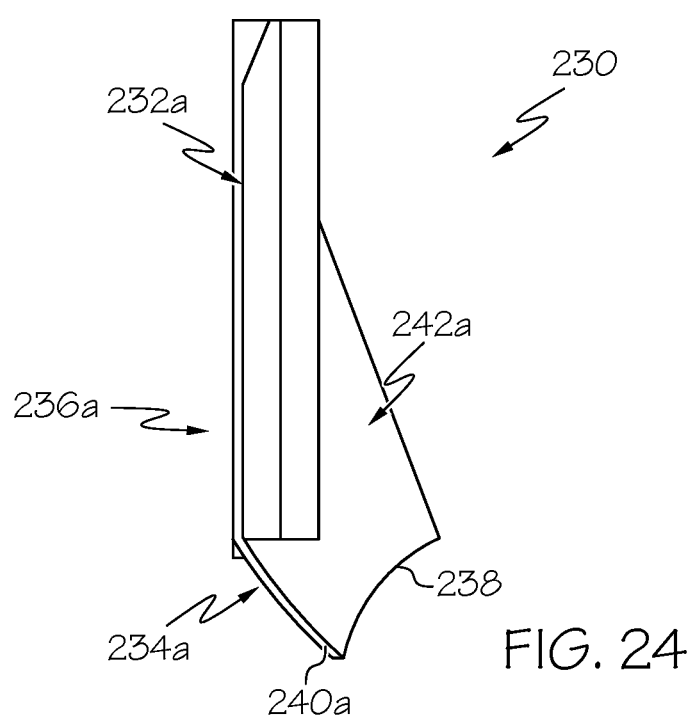
FIG. 24 is a side view of the edge director of FIG. 23.
Figure 25:
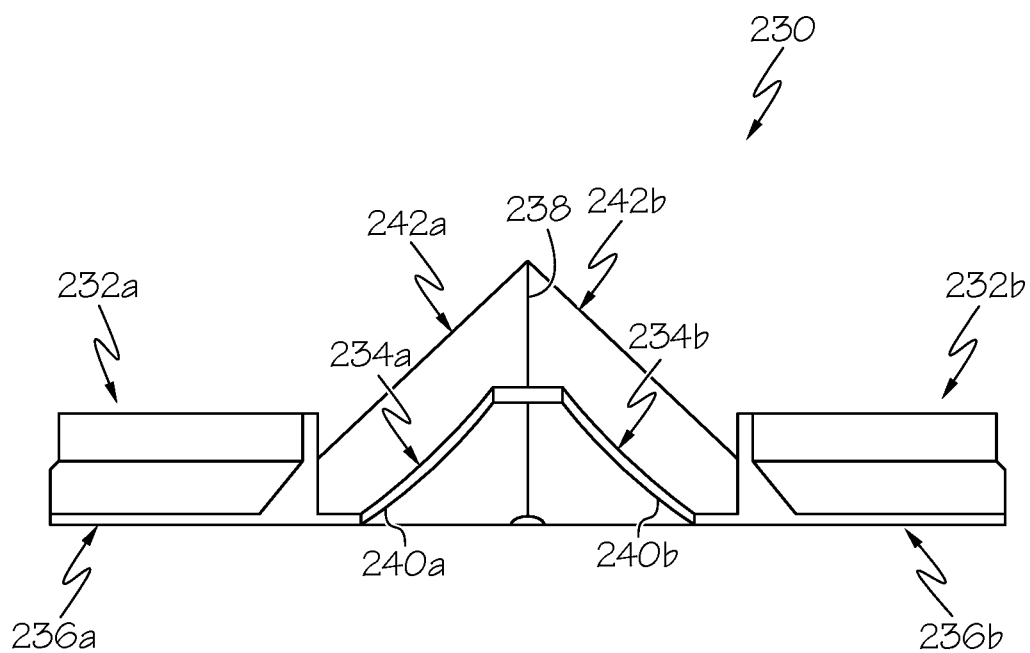
FIG. 25 is a bottom view of the edge director of FIG. 23.

FIG. 23-26 illustrate another embodiment of an edge director 230 that includes other flow control features. Referring to FIG. 23, the edge director is a variation of the edge director 180 that includes both channel structures 232a and 232b and plate structures 234a and 234b as flow directing features. The channel structures 232a and 232b extend along a height of flow blocking portions 236a and 236b and extend toward each other at immersion edge 238. The channel structures 232a and 232b channel glass flow toward the fusion plane and the plate structures 234a and 234b.

Figure 26:
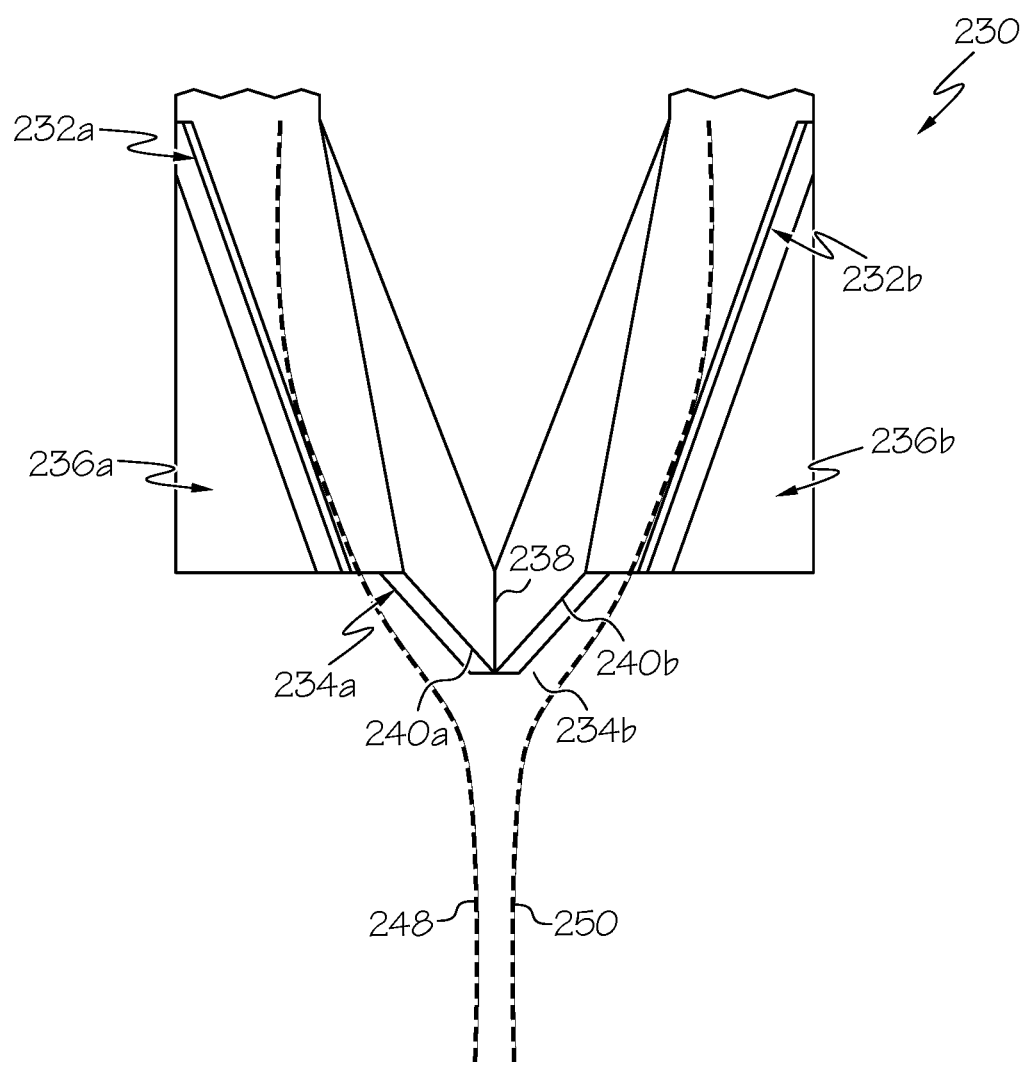
FIG. 26 is a front view of the edge director of FIG. 23.

The plate structures 234a and 234b extend along a tail portion 240a, 240b of flow directing portions 242a and 242b. The plate structures 234a and 234b have a horizontal component normal to the fusion plane and provide an additional surface to oppose forces acting horizontally on the glass flow and direct the glass flow toward the fusion plane. Dashed lines 248 and 250 of FIG. 26 are illustrative of glass flow path illustrating edges of the glass flow converging at the root 76 under steady-state operating conditions. Any of the pedestal structures, channel structures and plate structures may be used alone or together with the LCEDs.

The above-described edge directors can produce a significantly better fused edge at the start of the free ribbon boundary (i.e., the root line or bottom edge). The glass ribbon can be significantly less susceptible to sheet width variation instability where the viscous ribbon width varies with time in an unstable fashion. This reduction in sheet width variation can enable the ability to create thinner beads via end mass flow reduction and can also enable increased pulling speed on the fused glass ribbon for thinner sheet capability. Cone angles can be selected to up to 90 degrees, at which there is no edge director, allowing design optimization for various situations. LCEDs disclosed herein have less out-of-plane protrusion which can allow for reduced heat loss for edge director devit mitigation.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An apparatus for downwardly drawing a glass ribbon comprising:
    a forming vessel comprising:
        an upper portion including a pair of outside surfaces that extend parallel to each other, the pair of outside surfaces defining a width of the forming vessel therebetween;
        a forming wedge portion including a pair of downwardly inclined forming surfaces converging along a downstream direction to form a bottom edge;
        a flow blocking portion that extends alongside the forming wedge;
    an edge director comprising:
        a first flow directing portion formed from an arc portion of a first frustoconical or conical shape that intersects one of the inclined forming surfaces along a first edge of the first flow directing portion and intersects the flow blocking portion along a second edge of the first flow directing portion; and
        a second flow directing portion formed from an arc portion of a second frustoconical or conical shape that intersects the other of the inclined forming surfaces along a first edge of the second flow directing portion and intersects the flow blocking portion along a second edge of the second flow directing portion;
    wherein an edge director width is no greater than 80 percent of the width of the forming vessel;
    wherein the first edges of the first flow directing portion and the second flow directing portion meet at the bottom edge of the forming edge forming an immersion point and an immersion edge; and
    wherein the flow blocking portion comprises a channel structure to channel glass toward the first or second flow directing portions, the channel structure extending at an angle on and along a height of the flow blocking portion and being angled toward the immersion edge.

2. The apparatus of claim 1, wherein the first flow directing portion comprises a tail portion that extends from the immersion edge at an intersection with the immersion edge and intersects the flow blocking portion at the lowermost endpoint of intersection of the first flow directing portion.

3. The apparatus of claim 2, wherein the second flow directing portion comprises a tail portion that extends from the immersion edge at the intersection with the immersion edge and intersects the flow blocking portion at the lowermost endpoint of intersection of the second flow directing portion.

4. The apparatus of claim 3, wherein a tail depth of the tail portions of the first flow directing portion and the second flow directing portion are between 10 percent and 30 percent of a height of the forming wedge.

5. The apparatus of claim 3, wherein at least one of the tail portions of the first flow directing portion and the second flow directing portion comprises a plate structure extending outwardly therefrom in a direction away from the forming edge.

6. The apparatus of claim 1, wherein the flow blocking structure comprises a pedestal structure that coextends along the flow blocking portion and out of a plane of the flow blocking portion at a preselected pedestal incline angle measured from vertical and terminating at an edge that extends downward toward the immersion edge at a preselected pedestal cut angle as measured from a bottom edge of the flow blocking portion.

7. The apparatus of claim 6, wherein the preselected pedestal incline angle is between two degrees and ten degrees and the preselected pedestal cut angle is between 20 degrees and 45 degrees.

8. The apparatus of claim 1, wherein the first and second cone shapes have a cone angle of greater than 20 degrees, the cone angle measured from a central axis of the respective first and second frustoconical or conical shapes to an outer surface of the respective first and second frustoconical or conical shapes.

9. The apparatus of claim 8, wherein the first edge of the first flow directing portion is tangent to the one of the inclined forming surfaces.

10. The apparatus of claim 9, wherein the first edge of the second flow directing portion is tangent to the other of the inclined forming surfaces.

* * * * *